US012718966B2

(12) United States Patent
Rothschild

(10) Patent No.: US 12,718,966 B2
(45) Date of Patent: Aug. 25, 2026

(54) X-RAY CHOPPER WHEEL ASSEMBLY AND METHOD

(71) Applicant: Viken Detection Corporation, Burlington, MA (US)

(72) Inventor: Peter J. Rothschild, Newton, MA (US)

(73) Assignee: VIKEN DETECTION CORPORATION, Burlington, MA (US)

( * ) Notice: Subject to any disclaimer, the term of this patent is extended or adjusted under 35 U.S.C. 154(b) by 0 days.

(21) Appl. No.: 18/475,703

(22) Filed: Sep. 27, 2023

(65) Prior Publication Data

US 2024/0136084 A1 Apr. 25, 2024
US 2024/0233975 A9 Jul. 11, 2024

Related U.S. Application Data

(63) Continuation of application No. 17/454,993, filed on Nov. 15, 2021, now Pat. No. 11,776,706, which is a (Continued)

(51) Int. Cl.
*G21K 1/04* (2006.01)
*G21K 1/10* (2006.01)

(52) U.S. Cl.
CPC ............... *G21K 1/04* (2013.01); *G21K 1/043* (2013.01); *G21K 1/10* (2013.01)

(58) Field of Classification Search
CPC ............. G21K 1/04; G21K 1/043; G21K 1/10
See application file for complete search history.

(56) References Cited

U.S. PATENT DOCUMENTS 3,780,291 A * 12/1973 Stein .................... G01N 23/043 378/146
RE28,544 E * 9/1975 Stein .................... G03B 42/028 378/146

(Continued)

FOREIGN PATENT DOCUMENTS

CN 201340400 Y 11/2009
CN 107209282 A 9/2017

(Continued)

OTHER PUBLICATIONS

Stephen S. Korniczky, Videray Follow-up Response to Viken letter of Sep. 19, 2023, Nov. 10, 2023, 13 pages.

(Continued)

*Primary Examiner* — Hugh Maupin
(74) *Attorney, Agent, or Firm* — Merchant & Gould P.C.

(57) ABSTRACT

An x-ray chopper wheel assembly includes a disk chopper wheel and a source-side scatter plate that has a solid cross-sectional area that absorbs x-ray radiation and is substantially smaller than a solid cross-sectional area of the disk chopper wheel. The assembly also includes a support structure that secures the source-side scatter plate substantially parallel to the disk chopper wheel, with a source-side gap between the scatter plate and the disk chopper wheel being a distance that substantially prevents x-ray leakage. An additional, output-side scatter plate may also be provided to reduce x-ray leakage further. Embodiments enable safe operation while significantly reducing weight, which is advantageous for a variety of disk-chopper-wheel-based x-ray scanning systems, especially hand-held x-ray scanners.

30 Claims, 11 Drawing Sheets

Related U.S. Application Data continuation of application No. 16/935,787, filed on Jul. 22, 2020, now Pat. No. 11,200,998, which is a continuation of application No. 15/946,425, filed on Apr. 5, 2018, now Pat. No. 10,770,195.

(60) Provisional application No. 62/482,064, filed on Apr. 5, 2017.

(56) References Cited

U.S. PATENT DOCUMENTS

| | | | | |
|---|---|---|---|---|
| 4,031,401 | A | 6/1977 | Jacob | |
| 4,242,583 | A | 12/1980 | Annis et al. | |
| 4,260,898 | A | 4/1981 | Annis | |
| 4,315,146 | A | 2/1982 | Rudin | |
| 4,342,914 | A | 8/1982 | Bjorkholm | |
| 4,414,682 | A | 11/1983 | Annis et al. | |
| 4,472,822 | A | 9/1984 | Swift | |
| 4,503,332 | A | 3/1985 | Annis | |
| 4,646,339 | A | 2/1987 | Rice | |
| 4,799,247 | A | 1/1989 | Annis et al. | |
| 4,809,312 | A | 2/1989 | Annis | |
| 5,022,062 | A | 6/1991 | Annis | |
| 5,103,099 | A | 4/1992 | Bourdinaud et al. | |
| 5,179,581 | A | 1/1993 | Annis | |
| 5,181,234 | A | 1/1993 | Smith | |
| 5,224,144 | A | 6/1993 | Annis | |
| 5,391,878 | A | 2/1995 | Petroff | |
| 5,642,394 | A | 6/1997 | Rothschild | |
| 5,666,393 | A | 9/1997 | Annis | |
| 5,692,028 | A | 11/1997 | Geus et al. | |
| 5,764,683 | A | 6/1998 | Swift et al. | |
| 5,783,829 | A | 7/1998 | Sealock et al. | |
| 5,903,623 | A | 5/1999 | Swift et al. | |
| 6,078,052 | A | 6/2000 | DiFilippo | |
| 6,192,104 | B1 | 2/2001 | Adams et al. | |
| 6,252,929 | B1 | 6/2001 | Swift et al. | |
| 6,272,206 | B1 | 8/2001 | Bjorkholm | |
| 6,292,533 | B1 | 9/2001 | Swift et al. | |
| 6,434,219 | B1 | 8/2002 | Rothschild et al. | |
| 6,451,040 | B1 | 9/2002 | Purcell et al. | |
| 6,461,040 | B1 | 10/2002 | Mattson et al. | |
| 6,525,320 | B1 | 2/2003 | Juni | |
| 7,099,434 | B2 | 8/2006 | Adams et al. | |
| 7,115,875 | B1 | 10/2006 | Worstell | |
| 7,200,201 | B2 | 4/2007 | Unger et al. | |
| 7,218,704 | B1 | 5/2007 | Adams et al. | |
| 7,286,636 | B2 | 10/2007 | Unger et al. | |
| 7,310,407 | B2 | 12/2007 | Juni | |
| 7,551,715 | B2 | 6/2009 | Rothschild et al. | |
| 7,561,666 | B2 | 7/2009 | Annis | |
| 7,593,510 | B2 | 9/2009 | Rothschild | |
| 7,995,707 | B2 | 8/2011 | Rothschild et al. | |
| 8,116,575 | B1 | 2/2012 | Saisan et al. | |
| 8,199,996 | B2 | 6/2012 | Hughes | |
| 8,774,362 | B2 | 7/2014 | Hughes | |
| 8,861,684 | B2 | 10/2014 | Al-Kofahi et al. | |
| 9,146,201 | B2 | 9/2015 | Schubert et al. | |
| 9,285,488 | B2 | 3/2016 | Arodzero et al. | |
| 10,739,491 | B2 | 8/2020 | Yang et al. | |
| 10,762,998 | B2 | 9/2020 | Rothschild | |
| 10,762,999 | B2 | 9/2020 | Kaszuba et al. | |
| 10,770,195 | B2 | 9/2020 | Rothschild | |
| 10,794,843 | B2 | 10/2020 | Rothschild et al. | |
| 10,959,689 | B2 | 3/2021 | Nariyuki et al. | |
| 11,200,998 | B2 | 12/2021 | Rothschild | |
| 2001/0016028 | A1 | 8/2001 | Adams et al. | |
| 2002/0031202 | A1 * | 3/2002 | Callerame | G01N 23/20 378/57 |
| 2004/0017888 | A1 | 1/2004 | Seppi et al. | |
| 2006/0083354 | A1 | 4/2006 | Tybinkowski et al. | |
| 2006/0104415 | A1 | 5/2006 | Unger et al. | |
| 2006/0251214 | A1 | 11/2006 | Unger et al. | |
| 2008/0037707 | A1 | 2/2008 | Rothschild | |
| 2008/0170661 | A1 | 7/2008 | Unger et al. | |
| 2009/0086906 | A1 | 4/2009 | Clayton | |
| 2009/0086907 | A1 | 4/2009 | Smith | |
| 2009/0103686 | A1 | 4/2009 | Rothschild | |
| 2009/0175412 | A1 | 7/2009 | Grodzins | |
| 2010/0316186 | A1 | 12/2010 | Hyvarinen | |
| 2011/0058644 | A1 | 3/2011 | Thran et al. | |
| 2011/0103548 | A1 | 5/2011 | Bendahan | |
| 2012/0106714 | A1 | 5/2012 | Grodzins | |
| 2012/0236990 | A1 | 9/2012 | Rothschild | |
| 2012/0288063 | A1 * | 11/2012 | Hughes | G01V 5/222 378/87 |
| 2013/0134930 | A1 | 5/2013 | Konkle et al. | |
| 2013/0195248 | A1 | 8/2013 | Rothschild et al. | |
| 2013/0202089 | A1 | 8/2013 | Schubert et al. | |
| 2013/0208857 | A1 | 8/2013 | Arodzero et al. | |
| 2013/0315368 | A1 | 11/2013 | Turner | |
| 2016/0070006 | A1 | 3/2016 | Konkle et al. | |
| 2017/0052125 | A1 | 2/2017 | Georgeson et al. | |
| 2017/0332986 | A1 | 11/2017 | Grondin et al. | |
| 2017/0358380 | A1 | 12/2017 | Rothschild | |
| 2018/0294066 | A1 | 10/2018 | Rothschild | |
| 2019/0043633 | A2 | 2/2019 | Rothschild | |
| 2019/0242834 | A1 | 8/2019 | Rothschild et al. | |
| 2019/0346382 | A1 | 11/2019 | Rothschild | |
| 2019/0380664 | A1 | 12/2019 | Nariyuki et al. | |
| 2020/0025968 | A1 | 1/2020 | Yang et al. | |
| 2020/0326291 | A1 | 10/2020 | Rothschild | |
| 2021/0005340 | A1 | 1/2021 | Rothschild | |
| 2021/0074445 | A1 | 3/2021 | Rothschild | |
| 2022/0003693 | A1 | 1/2022 | Rothschild | |
| 2022/0091054 | A1 | 3/2022 | Rothschild | |

FOREIGN PATENT DOCUMENTS

| | | | |
|---|---|---|---|
| CN | 108318512 | A | 7/2018 |
| CN | 115112694 | A | 9/2022 |
| EP | 2667184 | A1 | 11/2013 |
| EP | 3399303 | A1 | 11/2018 |
| EP | 3505975 | A1 | 7/2019 |
| GB | 2084829 | A | 4/1982 |
| WO | 2001/037287 | A1 | 5/2001 |
| WO | 2005/079437 | A2 | 9/2005 |
| WO | 2011/053972 | A2 | 5/2011 |
| WO | 2012/058207 | A2 | 5/2012 |
| WO | 2012/174265 | A1 | 12/2012 |
| WO | 2013/112819 | A1 | 8/2013 |
| WO | 2014/058495 | A2 | 4/2014 |
| WO | 2016/081881 | A1 | 5/2016 |
| WO | 2019/152900 | A1 | 8/2019 |
| WO | 2019/217596 | A1 | 11/2019 |

OTHER PUBLICATIONS

*Videray Technologies, Inc. and TEK84, Inc.* vs. *Viken Detection Corp.*, Patent Complaint, Civil Action No. 23-13035, U.S. District Court of MA, Dec. 8, 2023, 92 pages.

Case, G. L., et al., "Wavelength-Shifting Fiber Readout of LaCl and LaBr scintillators," Proc. of SPIE, UV, X-Ray, and gamma-Ray Space Instrumentation for Astronomy XIV, 58980K; vol. 5898, 8 pages (2005).

Hutchinson, D. P., et al., "Optical readout for Imaging Neutron Scintillation Detectors," Proc. of SPIE; vol. 4785; 262-267 (2002).

Keizer, F., "The Optimal Cosmic Ray Detector for High-Schools," HiSparc Collaboration, 2011.

Maekawa, T., et al., "Thin Beta-ray Detectors using Plastic Scintillator Combined with Wavelength-shifting Fibers for Surface Contamination Monitoring," Journal of Nuclear Science and Technology, vol. 35; No. 12; pp. 886-894 (1998).

Nishikido, F., et al., "X-ray Detector made of Plastic Scintillators and WLS fiber for real-time dose Distribution Monitoring in Interventional Radiology," IEEE Nuclear Science Symposium and Medical Imaging Conference (NSS/MIC), pp. 1272-1274 (2012).

Notification of Transmittal of the International Preliminary Report on Patentability for International Application No. PCT/US2015/061952, entitled: "X-Ray Scanning System," dated May 23, 2017.

(56) References Cited

OTHER PUBLICATIONS

Notification of Transmittal of the International Search Report and Written Opinion of the International Searching Authority for International Application No. PCT/US2015/061952, entitled: "X-Ray Scanning System," dated Mar. 7, 2016.
Stein, J. A. and Swift, R. D. "Flying Spot X-Ray Imaging Systems," Materials Evaluation, vol. 30; No. 7; 137-148 (1972).
Worstell, W., et al., "Scintillator Crystal Readout with Wavelength-Shifting Optical Fibers," IEEE, pp. 1869-1873 (1995).
Plaintiff's Motion for Temporary Restraining Order and Preliminary Injunction, Civil Action No. 1:19-cv-10614-NMG, 3 pages, Filed Apr. 16, 2019.
Defendants' Opposition to Plaintiff's Motion for Preliminary Injunction, Civil Action No. 19-cv-10614-NMG, 121 pages, Filed Apr. 29, 2019.
Reply in Support of Plaintiff's Motion for Preliminary Injunction, Civil Action No. 1:19-cv-10614-NMG, 8 pages, Filed May 28, 2019.
Supplemental Brief in Support of Plaintiff's Motion for Preliminary Injunction, Civil Action No. 1:19-cv-10614-NMG, 5 pages, Filed Jun. 12, 2019.
Affidavit Of Paul Bradshaw, Civil Action No. 1:19-cv-10614-NMG, Filed Apr. 29, 2019 (7 pages).
Mini Z Handheld Z Backscatter Screening System Overview, Civil Action No. 1:19-cv-10614-NMG, Filed Apr. 29, 2019 (18 pages).
Van Liew, S., "New Developments in Portable Backscatter Systems"; Civil Action No. 1:19-cv-10614-NMG, Filed Apr. 29, 2019 (43 pages).
U.S. Non-Final Office Action for U.S. Appl. No. 15/946,425, entitled "X-Ray Chopper Wheel Assembly," mailed on Oct. 3, 2019.
Notice of Allowance for U.S. Appl. No. 15/946,425, entitled "X-Ray Chopper Wheel Assembly," mailed on Apr. 27, 2020.
Corrected Notice of Allowance for U.S. Appl. No. 15/946,425, entitled "X-Ray Chopper Wheel Assembly," mailed on Aug. 12, 2020.
Notice of Allowance for U.S. Appl. No. 16/935,787, entitled "X-Ray Chopper Wheel Assembly," mailed on Aug. 12, 2021.
USPTO, Office Action issued in U.S. Appl. No. 17/494,272 dated Oct. 14, 2022 (5 pages).
USPTO, Office Action issued in U.S. Appl. No. 17/494,272 dated May 22, 2023 (8 pages).
Stephen S. Korniczy, letter to Christopher Schultz, Esq. re: "Tek84—Response to Jan. 24, 2022 letter from Viken" dated Aug. 10, 2022 (9 pages).
Declaration of Dr. Steven W. Smith in Support of Plaintiff's Opening Claim Construction Brief, United States District Court, District of Massachusetts, Civil Action No. 1:23-cv-13035-MJJ, Doc No. 54, dated Mar. 4, 2025, 34 pages.
Arent Fox Schiff LLP, Draft First Amended Complaint, United States District Court, District of Massachusetts, Civil Action No. 1:23-cv-13035-MJJ, 36 pages.
Schultz, C., Letter to Jesse A. Salen, Esq. of Sheppard, Mullin, Richter & Hampton LLP, Notice under Federal Rule of Civil Procedure 11, dated Apr. 4, 2025, 5 pages.
Arent Fox Schiff llp et al., Joint Claim Construction Statement, United States District Court, District of Massachusetts, Civil Action No. 1:23-cv-13035-MJJ, Doc. No. 50, dated Feb. 11, 2025, 6 pages.
Sheppard, Mullin, Richter & Hampton LLP, Plaintiffs' Responsive Claim Construction Brief, United States District Court, District of Massachusetts, Civil Action No. 1:23-cv-13035-MJJ, Doc. No. 74, dated Apr. 15, 2025, 19 pages.
Sheppard, Mullin, Richter & Hampton LLP, Plaintiffs Videray Technologies, Inc. and Tek84, Inc.'s Memorandum in Support of its Motion for Leave to Amend Preliminary Patent-Related Disclosures, United States District Court, District of Massachusetts, Civil Action No. 1:23-cv-13035-MJJ, Doc. No. 62-1, dated Mar. 28, 2025, 18 pages.
Exhibit 4, United States District Court, District of Massachusetts, Civil Action No. 1:23-cv-13035-MJJ, Doc. No. 62-6, dated Mar. 28, 2025, 19 pages.
Exhibit 14, United States District Court, District of Massachusetts, Civil Action No. 1:23-cv-13035-MJJ, Doc. No. 62-16, dated Mar. 28, 2025, 244 pages.
Exhibit 15, United States District Court, District of Massachusetts, Civil Action No. 1:23-cv-13035-MJJ, Doc. No. 62-17, dated Mar. 28, 2025, 40 pages.
Exhibit 16, United States District Court, District of Massachusetts, Civil Action No. 1:23-cv-13035-MJJ, Doc. No. 62-18, dated Mar. 28, 2025, 26 pages.
Exhibit 17, United States District Court, District of Massachusetts, Civil Action No. 1:23-cv-13035-MJJ, Doc. No. 62-19, dated Mar. 28, 2025, 29 pages.
First Amended Complaint, U.S. District Court, District of Massachusetts, Civil Action No. 1:23-CV-13035-PBS, with exhibit, 103 pages, Sep. 8, 2025.
Exhibit A, 110-1, U.S. Pat. No. 10,770,195 B2, 23 pages, First Amended Complaint, Sep. 8, 2025.
Exhibit B, 110-2, U.S. Pat. No. 11,200,998 B2, 22 pages, First Amended Complaint, Sep. 8, 2025.
Exhibit C, 110-3, U.S. Pat. No. 11,776,706 B2, 23 pages, First Amended Complaint, Sep. 8, 2025.
Plaintiffs Videray Technologies, Inc. and TeK84, Inc.'s Amended Preliminary Patent-Related Disclosures Under Local Rule 16.6(d)(4), Civil Action No. 1:23-cv-13035-MJJ, with exhibits, 8,569 pages, Mar. 13, 2025.
Exhibit D-01—Invalidity Contention Chart for the '195 Patent Based on Annis, '144; 134 pages, Amended Preliminary Patent-Related Disclosures, Mar. 13, 2025.
Exhibit D-02—Invalidity Contention Chart for the '195 Patent Based on Annis, '156; 115 pages, Amended Patent-Related Disclosures, Mar. 13, 2025.
Exhibit D-03—Invalidity Contention Chart for the '195 Patent Based on Annis, '312; 112 pages, Amended Patent-Related Disclosures, Mar. 13, 2025.
Exhibit D-04—Invalidity Contention Chart for the '195 Patent Based on Annis, '393; 118 pages, Amended Patent-Related Disclosures, Mar. 13, 2025.
Exhibit D-05—Invalidity Contention Chart for the '195 Patent Based on Annis, '666; 243 pages, Amended Patent-Related Disclosures, Mar. 13, 2025.
Exhibit D-06—Invalidity Contention Chart for the '195 Patent Based on Bendahan, '702; 306 pages, Amended Patent-Related Disclosures, Mar. 13, 2025.
Exhibit D-07—Invalidity Contention Chart for the '195 Patent Based on Chen '501; 245 pages, Amended Patent-Related Disclosures, Mar. 13, 2025.
Exhibit D-09—Invalidity Contention Chart for the '195 Patent Based on Morton '696; 238 pages, Amended Patent-Related Disclosures, Mar. 13, 2025.
Exhibit D-10—Invalidity Contention Chart for the '195 Patent Based on Öjelund '140; 137 pages, Amended Patent-Related Disclosures, Mar. 13, 2025.
Exhibit D-11—Invalidity Contention Chart for the '195 Patent Based on Plewes '087; 78 pages, Amended Patent-Related Disclosures, Mar. 13, 2025.
Exhibit D-12—Invalidity Contention Chart for the '195 Patent Based on Qu '281; 131 pages, Amended Patent-Related Disclosures, Mar. 13, 2025.
Exhibit D-13—Invalidity Contention Chart for the '195 Patent Based on Rothschild '248; 105 pages, Amended Patent-Related Disclosures, Mar. 13, 2025.
Exhibit D-14—Invalidity Contention Chart for the '195 Patent Based on Rothschild '686; 86 pages, Amended Patent-Related Disclosures, Mar. 13, 2025.
Exhibit D-15—Invalidity Contention Chart for the '195 Patent Based on Rothschild '881; 189 pages, Amended Patent-Related Disclosures, Mar. 13, 2025.
Exhibit D-16—Invalidity Contention Chart for the '195 Patent Based on Smith '234; 131 pages, Amended Patent-Related Disclosures, Mar. 13, 2025.
Exhibit D-17—Invalidity Contention Chart for the '195 Patent Based on Stein '799; 89 pages, Amended Patent-Related Disclosures, Mar. 13, 2025.

(56) References Cited

OTHER PUBLICATIONS

Exhibit D-18—Invalidity Contention Chart for the '195 Patent Based on Swift '822; 187 pages, Amended Patent-Related Disclosures, Mar. 13, 2025.
Exhibit D-19—Invalidity Contention Chart for the '195 Patent Based on Tan '647; 63 pages, Amended Patent-Related Disclosures, Mar. 13, 2025.
Exhibit D-20—Invalidity Contention Chart for the '195 Patent Based on Wang '465; 193 pages, Amended Patent-Related Disclosures, Mar. 13, 2025.
Exhibit D-21—Invalidity Contention Chart for the '195 Patent Based on Secure 1000; 56 pages, Amended Patent-Related Disclosures, Mar. 13, 2025.
Exhibit D-22—Invalidity Contention Chart for the '195 Patent Based on Secure 2000; 32 pages, Amended Patent-Related Disclosures, Mar. 13, 2025.
Exhibit D-23—Invalidity Contention Chart for the '195 Patent Based on CastScope; 33 pages, Amended Patent-Related Disclosures, Mar. 13, 2025.
Exhibit D-24—Invalidity Contention Chart for the '195 Patent Based on Defender; 32 pages, Amended Patent-Related Disclosures, Mar. 13, 2025.
Exhibit D-25—Invalidity Contention Chart for the '195 Patent Based on Traveler; 32 pages, Amended Patent-Related Disclosures, Mar. 13, 2025.
Exhibit D-26—Invalidity Contention Chart for the '195 Patent Based on HBI-120; 11 pages, Amended Patent-Related Disclosures, Mar. 13, 2025.
Exhibit D-27—Invalidity Contention Chart for the '195 Patent Based on Mini-Z; 39 pages, Amended Patent-Related Disclosures, Mar. 13, 2025.
Exhibit E-01—Invalidity Contention Chart for the '998 Patent Based on Annis '144; 101 pages, Amended Patent-Related Disclosures, Mar. 13, 2025.
Exhibit E-02—Invalidity Contention Chart for the '998 Patent Based on Annis '156; 115 pages, Amended Patent-Related Disclosures, Mar. 13, 2025.
Exhibit E-03—Invalidity Contention Chart for the '998 Patent Based on Annis '312; 84 pages, Amended Patent-Related Disclosures, Mar. 13, 2025.
Exhibit E-04—Invalidity Contention Chart for the '998 Patent Based on Annis '393; 100 pages, Amended Patent-Related Disclosures, Mar. 13, 2025.
Exhibit E-05—Invalidity Contention Chart for the '998 Patent Based on Annis '666; 176 pages, Amended Patent-Related Disclosures, Mar. 13, 2025.
Exhibit E-06—Invalidity Contention Chart for the '998 Patent Based on Bendahan '702; 232 pages, Amended Patent-Related Disclosures, Mar. 13, 2025.
Exhibit E-07—Invalidity Contention Chart for the '998 Patent Based on Chen '501; 121 pages, Amended Patent-Related Disclosures, Mar. 13, 2025.
Exhibit E-08—Invalidity Contention Chart for the '998 Patent Based on Jacob '401; 72 pages, Amended Patent-Related Disclosures, Mar. 13, 2025.
Exhibit E-09—Invalidity Contention Chart for the '998 Patent Based on Morton '696; 198 pages, Amended Patent-Related Disclosures, Mar. 13, 2025.
Exhibit E-10—Invalidity Contention Chart for the '998 Patent Based on Öjelund '140; 108 pages, Amended Patent-Related Disclosures, Mar. 13, 2025.
Exhibit E-11—Invalidity Contention Chart for the '998 Patent Based on Plewes '087; 98 pages, Amended Patent-Related Disclosures, Mar. 13, 2025.
Exhibit E-12—Invalidity Contention Chart for the '998 Patent Based on Qu '281; 108 pages, Amended Patent-Related Disclosures, Mar. 13, 2025.
Exhibit E-13—Invalidity Contention Chart for the '998 Patent Based on Rothschild '248; 79 pages, Amended Patent-Related Disclosures, Mar. 13, 2025.
Exhibit E-14—Invalidity Contention Chart for the '998 Patent Based on Rothschild '686; 87 pages, Amended Patent-Related Disclosures, Mar. 13, 2025.
Exhibit E-15—Invalidity Contention Chart for the '998 Patent Based on Rothschild '881; 163 pages.
Exhibit E-16—Invalidity Contention Chart for the '998 Patent Based on Smith '234; 102 pages, Amended Patent-Related Disclosures, Mar. 13, 2025.
Exhibit E-17—Invalidity Contention Chart for the '998 Patent Based on Stein '799; 67 pages, Amended Patent-Related Disclosures, Mar. 13, 2025.
Exhibit E-18—Invalidity Contention Chart for the '998 Patent Based on Swift '822; 116 pages, Amended Patent-Related Disclosures, Mar. 13, 2025.
Exhibit E-19—Invalidity Contention Chart for the '998 Patent Based on Tan '647; 62 pages, Amended Patent-Related Disclosures, Mar. 13, 2025.
Exhibit E-20—Invalidity Contention Chart for the '998 Patent Based on Wang '465; 173 pages.
Exhibit E-21—Invalidity Contention Chart for the '998 Patent Based on Secure 1000; 30 pages.
Exhibit E-22—Invalidity Contention Chart for the '998 Patent Based on Secure 2000; 18 pages.
Exhibit E-23—Invalidity Contention Chart for the '998 Patent Based on CastScope; 19 pages.
Exhibit E-24—Invalidity Contention Chart for the '998 Patent Based on Defender; 18 pages.
Exhibit E-25—Invalidity Contention Chart for the '998 Patent Based on Traveler; 18 pages.
Exhibit E-26—Invalidity Contention Chart for the '998 Patent Based on HBI-120; 9 pages.
Exhibit E-27—Invalidity Contention Chart for the '998 Patent Based on Mini-Z; 25 pages.
Exhibit F-01—Invalidity Contention Chart for the '706 Patent Based on Annis '144; 147 pages.
Exhibit F-02—Invalidity Contention Chart for the '706 Patent Based on Annis '156; 111 pages.
Exhibit F-03—Invalidity Contention Chart for the '706 Patent Based on Annis '312; 126 pages.
Exhibit F-04—Invalidity Contention Chart for the '706 Patent Based on Annis '393; 124 pages.
Exhibit F-05—Invalidity Contention Chart for the '706 Patent Based on Annis '666; 239 pages.
Exhibit F-06—Invalidity Contention Chart for the '706 Patent Based on Bendahan '702; 306 pages.
Exhibit F-07—Invalidity Contention Chart for the '706 Patent Based on Chen '501; 141 pages.
Exhibit F-08—Invalidity Contention Chart for the '706 Patent Based on Jacob '401; 80 pages.
Exhibit F-09—Invalidity Contention Chart for the '706 Patent Based on Morton '696; 228 pages.
Exhibit F-10—Invalidity Contention Chart for the '706 Patent Based on ÖJelund '140; 156 pages.
Exhibit F-11—Invalidity Contention Chart for the '706 Patent Based on Plewes '087; 97 pages.
Exhibit F-12—Invalidity Contention Chart for the '706 Patent Based on Qu '281; 142 pages.
Exhibit F-13—Invalidity Contention Chart for the '706 Patent Based on Rothschild '248; 80 pages.
Exhibit F-14—Invalidity Contention Chart for the '706 Patent Based on Rothschild '686; 105 pages.
Exhibit F-15—Invalidity Contention Chart for the '706 Patent Based on Rothschild '881; 225 pages.
Exhibit F-16—Invalidity Contention Chart for the '706 Patent Based on Smith '234; 138 pages.
Exhibit F-17—Invalidity Contention Chart for the '706 Patent Based on Stein '799; 82 pages.
Exhibit F-18—Invalidity Contention Chart for the '706 Patent Based on Swift '822; 166 pages.
Exhibit F-19—Invalidity Contention Chart for the '706 Patent Based on Tan '647; 62 pages.
Exhibit F-20—Invalidity Contention Chart for the '706 Patent Based on Wang '465; 209 pages.

(56) References Cited

OTHER PUBLICATIONS

Exhibit F-21—Invalidity Contention Chart for the '706 Patent Based on Secure 1000; 43 pages.
Exhibit F-22—Invalidity Contention Chart for the '706 Patent Based on Secure 2000; 24 pages.
Exhibit F-23—Invalidity Contention Chart for the '706 Patent Based on CastScope; 25 pages.
Exhibit F-24—Invalidity Contention Chart for the '706 Patent Based on Defender; 24 pages.
Exhibit F-25—Invalidity Contention Chart for the '706 Patent Based on Traveler; 24 pages.
Exhibit F-26—Invalidity Contention Chart for the '706 Patent Based on HBI-120; 8 pages.
Exhibit F-27—Invalidity Contention Chart for the '706 Patent Based on Mini-Z; 29 pages.
Exhibit D-08—Invalidity Contention Chart for the '195 Patent Based on Jacob '401; 93 pages, Amended Patent-Related Disclosures, Mar. 13, 2025 (also disclosed in Applicant's Information Disclosure Statement as filed on May 18, 2026, appended to NPL #012., ("Exhibit D-07—Invalidity Contention Chart for the '195 Patent Based on Chen '501; 245 pages, Amended Patent-Related Disclosures, Mar. 13, 2025").
Laloubére et al., "Radiation Hygiene Expert Assessment of Mini Z Handheld Backscatter Imaging System", Jun. 22, 2015, 23 pages.

* cited by examiner

X-RAY CHOPPER WHEEL ASSEMBLY AND METHOD

RELATED APPLICATIONS

This application is a continuation of U.S. application Ser. No. 17/454,993, filed Nov. 15, 2021, which is a continuation of U.S. application Ser. No. 16/935,787, filed Jul. 22, 2020, now U.S. Pat. No. 11,200,998, which is a continuation of U.S. application Ser. No. 15/946,425, filed Apr. 5, 2018, now U.S. Pat. No. 10,770,195, which claims the benefit of U.S. Provisional Application No. 62/482,064, filed on Apr. 5, 2017. The entire teachings of the above applications are incorporated herein by reference.

BACKGROUND

X-ray backscatter imaging has been used for detecting concealed contraband, such as drugs, explosives, and weapons, since the late 1980s. Unlike traditional transmission x-ray imaging, which creates images by detecting the x-rays penetrating through an object, backscatter imaging uses reflected or scattered x-rays to create the image.

SUMMARY

In example embodiment assemblies, a disk chopper wheel need not be enclosed in a full shielded housing. Instead, embodiments incorporate a novel, open-geometry disk chopper wheel that includes one or more scatter plates especially configured to limit x-ray leakage and greatly reduce the weight of the chopper disk assembly relative to prior art systems. Embodiments are designed with one or more scatter plates on a source side of the disk chopper wheel, and embodiments may also optionally include one or more scatter plates on an exit side of the disk chopper wheel. The scatter plates are designed to absorb x-rays that are scattered off the chopper wheel, either in the forward or backward directions. A shielded structure may also be added to enclose a fan beam entering the chopper wheel assembly in a region between an x-ray source (e.g., x-ray tube) and the disk assembly.

In one embodiment, an x-ray chopper wheel assembly includes a disk chopper wheel configured to rotate about a rotation axis thereof. The rotation axis is perpendicular to a rotation plane of the disk chopper wheel, and the disk chopper wheel has a solid cross-sectional area in the rotation plane and is configured to absorb x-ray radiation received from an x-ray source at a source side of the disk chopper wheel (an input side at which radiation from an x-ray source is initially incident). The disk chopper wheel also defines one or more radial slit openings configured to pass x-ray radiation from the source side of the disk chopper wheel to an output side of the disk chopper wheel The x-ray chopper wheel assembly also includes a source-side scatter plate having a solid cross-sectional area in a plane parallel to the rotation plane of the disk chopper wheel. The source-side scatter plate is configured to absorb x-ray radiation and defines an open slot therein configured to pass x-ray radiation. The solid cross-sectional area of the source-side scatter plate is substantially smaller than the solid cross-sectional area of the disk chopper wheel. The assembly further includes a support structure configured to secure the source-side scatter plate substantially parallel to the rotation plane of the disk chopper wheel with a source-side gap between the source-side scatter plate and the source side of the disk chopper wheel.

The solid cross-sectional area of the source-side scatter plate in the plane parallel to the rotation plane of the disk chopper wheel may be less than 75%, less than 50%, less than 25%, or less than 10% of the cross-sectional area of the disk chopper wheel. The source-side gap may be in a range of approximately 0.5 mm to approximately 1.0 mm. The source-side scatter plate may be formed from tungsten or another high-Z material. The source-side scatter plate may have a thickness on the order of 1.0 mm. The cross-sectional area of the source-side scatter plate may be in a range of about 100% to about 5,000% larger or in a range of about 500% to about 10,000% larger than an open cross-sectional area of one of the one or more radial slit openings in the rotation plane of the disk chopper wheel.

The source-side scatter plate may have a plate width in a direction parallel to a radial direction of the disk chopper wheel, and this plate width may be in a range of about 10% to about 70% greater than a slit length of one of the one or more radial slit openings in the radial direction of the disk chopper wheel. The source-side scatter plate may be formed of pure or alloyed lead, tin, iron, or tungsten.

The assembly may further include an output-side scatter plate, which may have a solid cross-sectional area in a plane parallel to the rotation plane of the disk chopper wheel, with the output-side scatter plate configured to absorb x-ray radiation. The output-side scatter plate may define an open slot therein configured to pass x-ray radiation, and the solid cross-sectional area of the output-side scatter plate in the plane parallel to the rotation plane of the disk chopper wheel may be substantially smaller than the solid cross-sectional area of the disk.

The support structure may be further configured to secure the output-side scatter plate substantially parallel to the rotation plane of the disk chopper wheel with an output-side gap between the output-side scatter plate and the disk chopper wheel. The support structure may be further configured to secure the disk chopper wheel at the rotation axis thereof.

The support structure may include an inner portion configured to secure the disk chopper wheel at the rotation axis thereof, with one or more radial spokes extending from the inner portion and configured to secure the source-side scatter plate. The support structure may further include a source-side portion and an output-side portion, with the source-side and output-side portions configured to be connected together and to secure the disk chopper wheel therebetween. The support structure may be formed of aluminum. The support structure may be configured to be mounted within a hand-held x-ray scanner or within a fixed-mount or mobile x-ray scanning system.

The x-ray chopper wheel assembly may further include a shield structure configured to enclose the x-ray radiation in a region of travel between the x-ray source and the source-side scatter plate.

The x-ray source may be configured to output x-rays having an end-point energy in a range of about 120 kilo-electron volts (keV) to about 450 keV.

The source-side scatter plate may be configured to output a fan beam of x-rays through the open slot therein, and the assembly may be configured to output a pencil beam of x-rays. The disk chopper wheel and source-side scatter plate may be arranged relative to each other to substantially confine x-ray radiation scattered therefrom. Substantial confinement may also be achieved based on an arrangement of the disk chopper wheel and source-side scatter plate with the optional output-side scatter plate.

The substantial confinement may limit leakage of scattered radiation to no more than 50% leakage of the radiation that is scattered or to a dose of no more than 5 milli-Rem per hour at a distance of 5 cm away from an outer surface of the assembly, whichever is greater. The substantial confinement may limit leakage of scattered radiation to no more than 10% of scattered radiation or to a dose of no more than 0.5 milli-Rem per hour at a distance of 5 cm away from the outer surface of the assembly, whichever is greater.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

An x-ray tube has been used to generate x-rays that are collimated into a fan beam by a slot in an attenuating plate. The fan beam is then typically "chopped" into a pencil beam by a rotating "chopper wheel" with slits therein. As the chopper wheel rotates, the wheel slits rotate across the fan beam, causing the x-ray pencil beam to scan over an object being imaged.

For backscatter imaging, the intensity of the x-rays scattered in the backward direction is then recorded by one or more large area backscatter detectors as a function of the position of the illuminating, scanning pencil x-ray beam. By moving the object through the plane in which the x-ray pencil beam scans, either on a conveyor or under the object's own power, a two-dimensional backscatter image of the object is produced. Chopper wheels usually include three basic types: a rotating disk, a rotating wheel, or a rotating hoop rotated through the fan beam.

Figure 3:
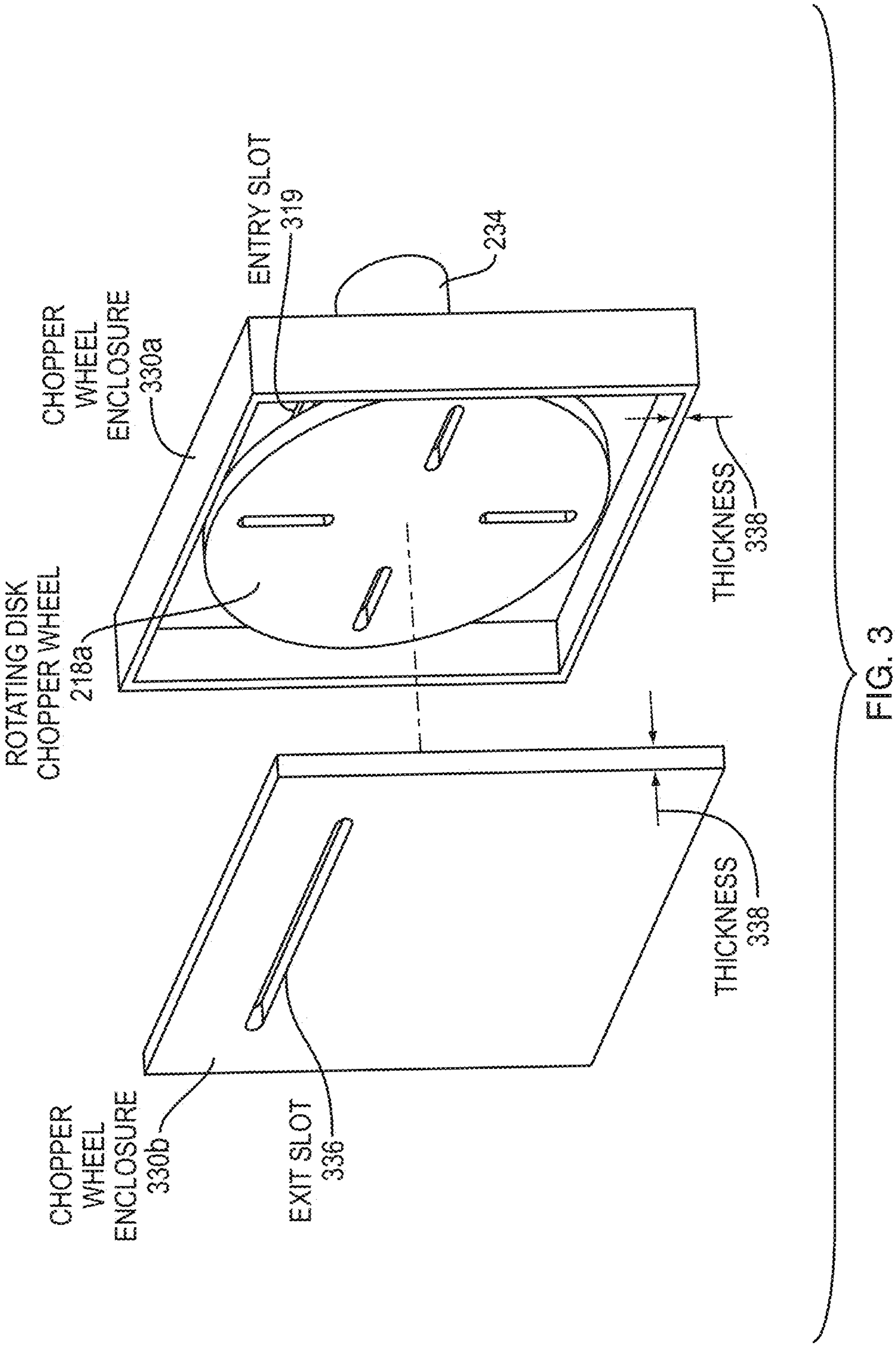
FIG. 3 (PRIOR ART)
FIG. 3 is a perspective illustration of a prior art chopper wheel with a full enclosing shield surrounding the wheel.

Existing x-ray backscatter imaging systems that implement a rotating disk chopper wheel also include a chopper wheel enclosure that completely contains the disk chopper wheel in a shielded housing, as described in relation to FIG. 3, for example. The bearings that support the disk are often mounted onto the interior of the housing, with the drive motor that rotates the disk being mounted onto the outside of the housing.

The shielded housing typically includes an aluminum box, for example, that is lined internally with sufficient lead to absorb any x-rays that are incident directly upon it, as well as any x-rays that have scattered from the chopper disk. An entry slot is typically provided for the incident fan beam of x-rays emitted from the x-ray tube to enter the shielded housing. An exit slot is also provided in the housing to allow the sweeping pencil beam, created by the rotating disk chopper wheel, to exit the housing.

For a 120 kiloelectron Volt (keV) to 160 keV backscatter x-ray system designed for scanning baggage, for example, the shielding is typically between ⅛ inches thick and ¼ inch thick. For a chopper disk that is 18 inches in diameter, for example, the lead shielding in such a disk housing can, therefore, weigh between about 40 pounds and 80 pounds. Moreover, for a system with a 4 inch diameter disk, the shielding in such a system can weigh between about 3 pounds and about 6 pounds. It would be advantageous to have a way to reduce these relatively high weights. A reduction in weight and cost would be advantageous for all types of rotating disk x-ray scanning systems, including forward and backward scattering systems and fixed-mount and mobile x-ray scanning systems. Moreover, reducing the weight of the chopper disk and related assembly would be especially advantageous to the feasibility of developing and deploying handheld x-ray scanning systems. However, any possible weight-reduced system should also include a way to maintain the degree of x-ray scattering confinement and related safety of use that existing shielded housings provide.

Disclosed herein are embodiment x-ray chopper wheel assemblies that can provide scanning x-ray pencil beams while shielding and attenuating scattered x-rays to safe levels without the weight of existing shielded housings. Embodiments can provide radiation safety levels comparable to existing, full-shielded disk housings such as those described in connection with FIG. 3, even with significantly reduced system weight relative to existing shielded disk housings. The reduced weight is advantageous for various types of x-ray scanning systems, and especially for handheld devices, such as the handheld system described in connection with FIG. 1A, for which system weight especially should be minimized for ease of use.

Figure 1A:
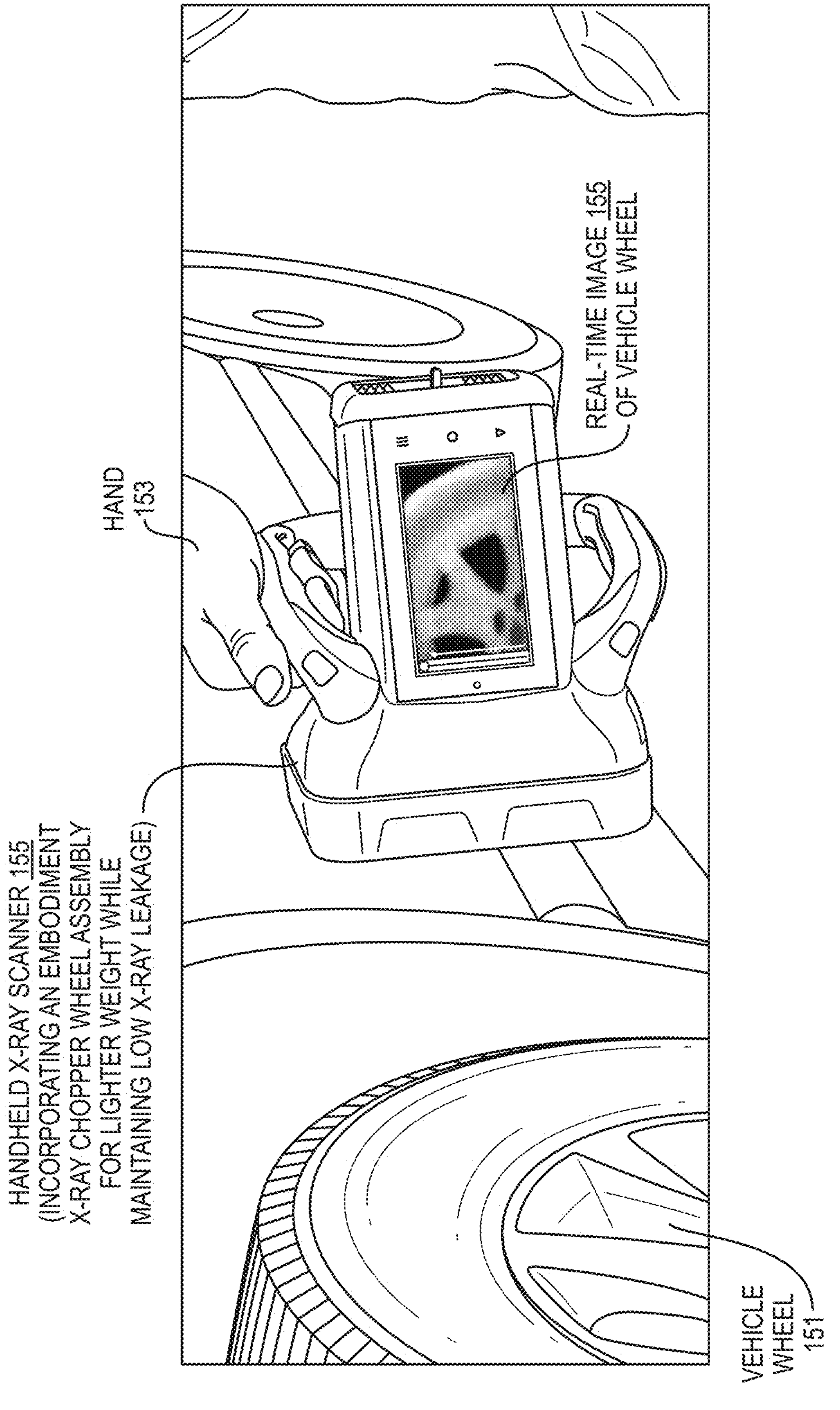
FIG. 1A is a photograph or illustration of a handheld x-ray scanner incorporating an embodiment chopper wheel assembly.

FIG. 1A is a photograph or illustration showing a handheld x-ray scanner 155 that incorporates an embodiment x-ray chopper wheel assembly. Various embodiment chopper wheel assemblies, such as those illustrated hereinafter in connection with FIGS. 1B, 4A, and 4B, for example, may be used to specifically facilitate operation of a handheld x-ray scanner, fixed-mount x-ray scanning system, such as that illustrated in FIG. 1B, or a mobile x-ray scanning system, such as a truck-mounted x-ray scanning system. Nonetheless, embodiments are particularly advantageous for handheld scanning systems such as the scanner 155, which can be carried and moved by a person to scan a vehicle, luggage, or other items flexibly to detect contraband, safety issues, etc.

As illustrated in FIG. 1A, a hand 153 of a person holds the scanner 155, and the scanner is directed at a vehicle wheel 151, an example target for x-ray scanning for contraband, and the scanner 155 is configured to produce a real-time image 155 of the vehicle wheel. An embodiment chopper wheel assembly, such as those illustrated in FIG. 1B or 4A-4B, for example, may be mounted within a handheld x-ray scanner, such as that illustrated in FIG. 1A. In addition, embodiments may be used advantageously by mounting them within a fixed-mount scanning system, such as that illustrated in FIG. 1B or a similar mobile x-ray scanning system that is mounted on a truck or other vehicle, for example.

Figure 1B:
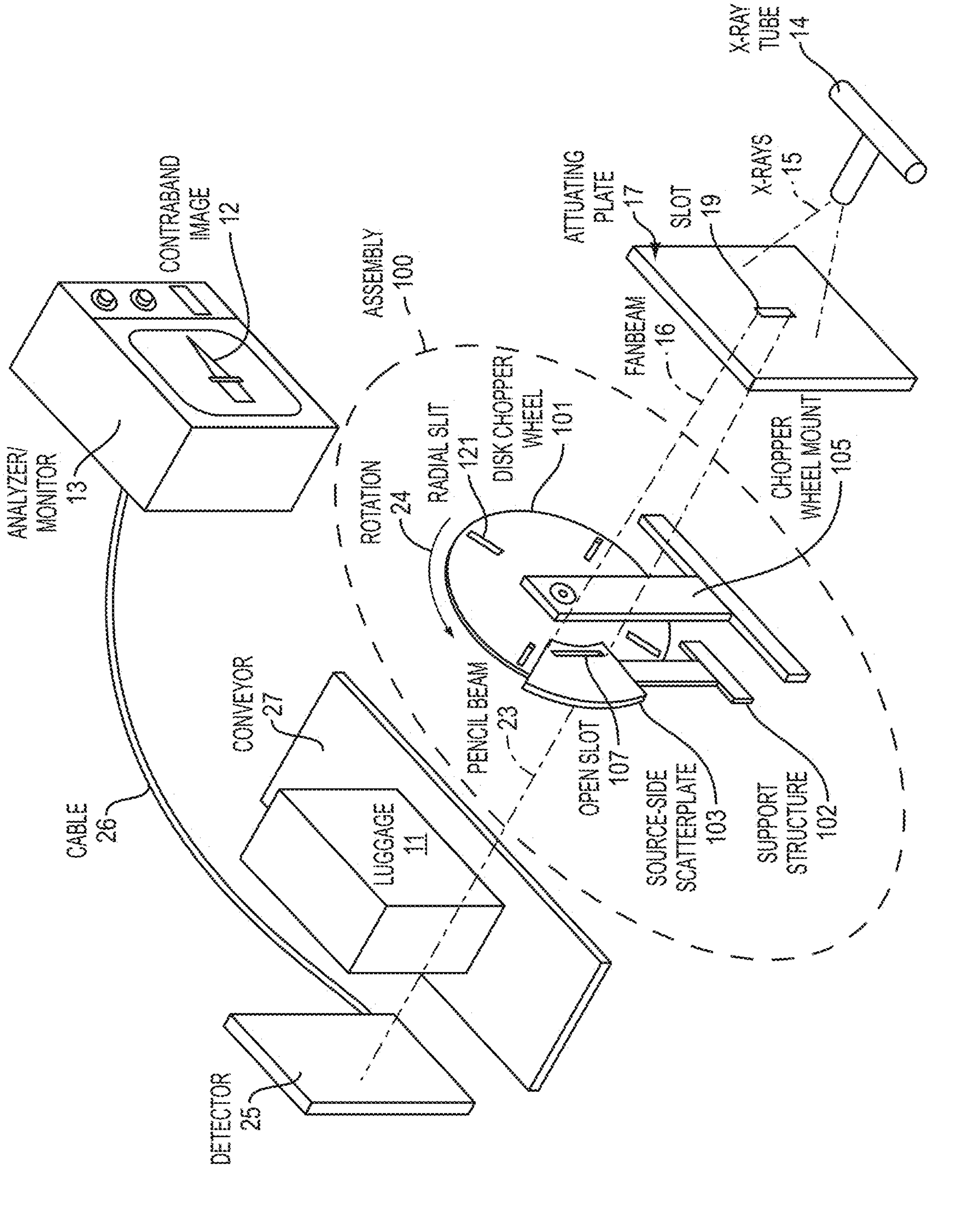
FIG. 1B is an illustration of a fixed-mount x-ray scanning system configured to scan luggage on a conveyor belt, the system incorporating an embodiment chopper wheel assembly.

FIG. 1B is an illustration of an embodiment fixed-mount x-ray scanning system used to scan luggage 11 that is moved along a conveyor belt 27. The scanning system includes an embodiment chopper wheel assembly 100 that is used in connection with an x-ray tube 14 and attenuating plate 17 to produce a pencil beam 23 that scans the luggage 11 with a vertical sweep as the luggage is moved along the conveyor belt 27. The transmitted pencil beam 23 is detected by a detector 25, which is connected via a cable 26 to an analyzer/monitor 13 that analyzes the detected signals from the detector 25 and displays them to show an image 12 of items within the luggage, such as contraband. In addition, the backscattered x-rays may be detected in backscatter detectors (not shown) positioned on the source-side of the system.

The chopper wheel assembly 100 of FIG. 1B particularly includes a disk chopper wheel 101 with radial slits 121. The disk chopper wheel is secured to a chopper wheel mount 105 by a rotation axis of the disk chopper wheel 101 to allow chopper wheel rotation 24. The assembly 100 also includes a source-side scatter plate 103 that defines an open slot 107 therein. The source-side scatter plate 103 is secured by a support structure 102 to be substantially parallel to the rotation plane of the disk chopper wheel 101 with a source-side gap between the source-side scatter plate and the source side of the disk chopper wheel. These details are further illustrated in relation to the alternative embodiment of FIGS. 4A-4B and the additional details of these embodiments as illustrated in FIGS. 5A-5B, 6, 7, 8A-8B, and 9.

The disk chopper wheel 101 is configured to rotate with a rotation 24 about a rotation axis that is perpendicular to a rotation plane of the disk chopper wheel. These details are further illustrated and described in connection with the specific embodiment shown in FIGS. 4A-4B and additional details thereof as illustrated in FIGS. 5A-5B, 6, 7, 8A-8B, and 9.

Figure 4A:
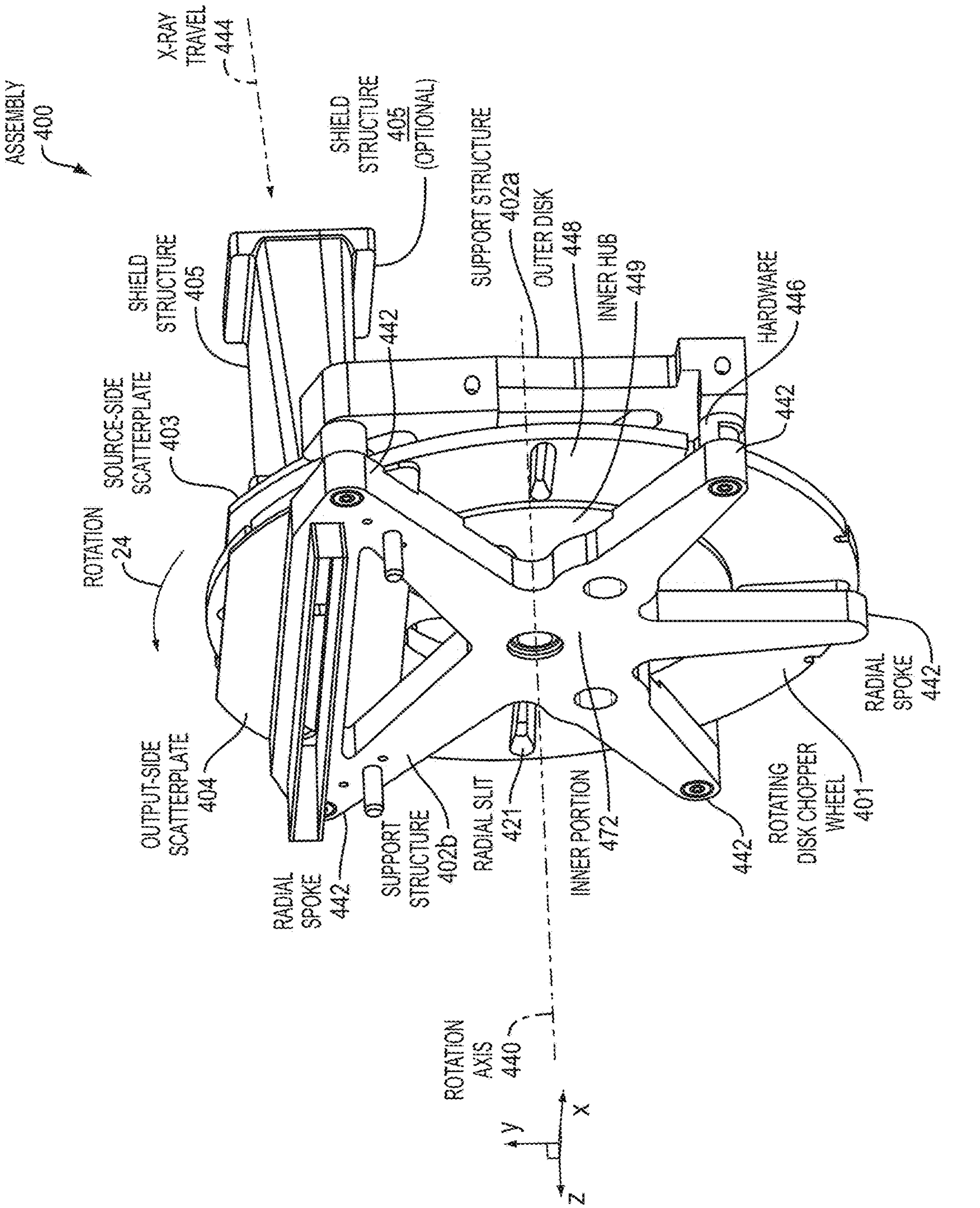
FIG. 4A is a perspective illustration of an embodiment chopper wheel assembly for x-ray scanning.
Figure 4B:
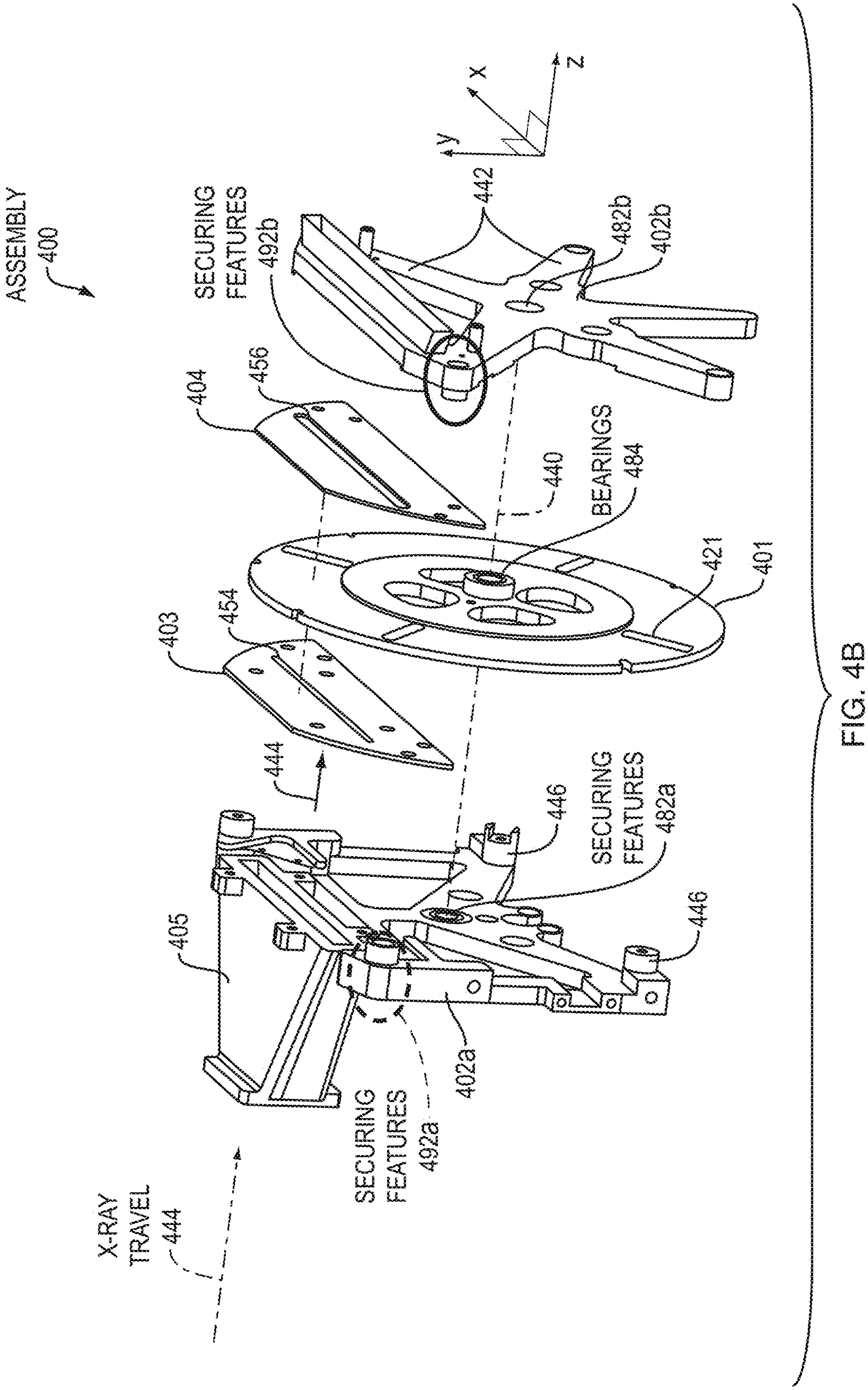
FIG. 4B is an exploded, perspective-view illustration of the embodiment chopper wheel assembly of FIG. 4A.
Figure 7:
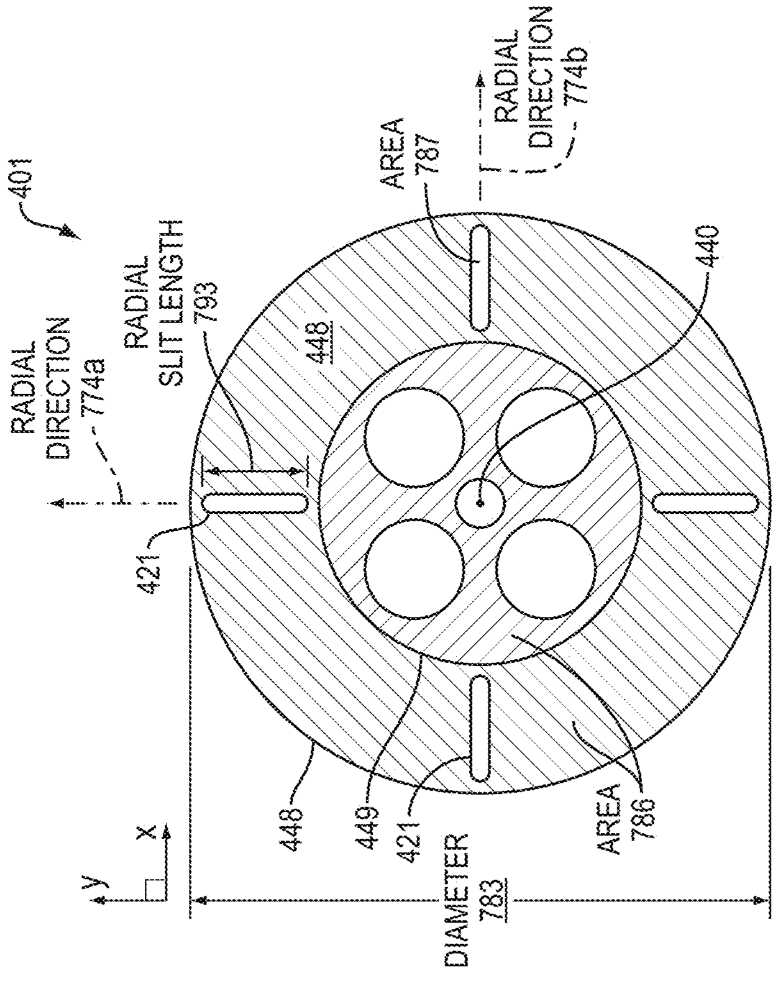
FIG. 7 is a cross-sectional view illustration of the disk chopper wheel used in the embodiment chopper wheel assembly of FIGS. 4A-4B.

The disk chopper wheel 101 has a solid cross-sectional area in the rotation plane, as further illustrated in FIG. 7 in connection with the embodiment of FIGS. 4A-4B. The disk chopper wheel 101 is configured to absorb x-ray radiation received from an x-ray source (here, the x-ray tube 14) at a source side of the disk chopper wheel (the side of the chopper wheel closest to the x-ray tube source 14). However, when the radial slit openings 121 in the disk chopper wheel 101 intersect with the open slot 107 in the source-side scatter plate 103 along the direction of travel of the x-rays 15, then the pencil beam 23 may pass through the source-side scatter plate 103 and disk chopper wheel 101 to an output side of the disk chopper wheel. This is further described in connection with FIG. 9, for example. The radial slit openings in the disk chopper wheel 101 and in chopper wheels in other embodiment assemblies described herein may have chamfered edges and may also may be tapered, as described in International Application PCT/US2015/061952, filed on Nov. 20, 2015, and published with International Publication Number WO 2016/081881 A1, which is incorporated herein by reference in its entirety.

The source-side scatter plate 103 has a solid cross-sectional area in a plane that is parallel to the rotation plane of the disk chopper wheel, as further illustrated in connection with FIG. 5A and FIG. 8A, for example. The source-side scatter plate 103 is configured to absorb x-ray radiation at solid portions of the plate, and also pass x-ray radiation through the open slot 107 to produce the pencil beam 23.

Advantageously, in embodiments described herein, such as those in FIGS. 1B, 2, and 4A-4B, for example, the solid cross-sectional area of the source-side scatter plate is substantially smaller than the solid cross-sectional area of the disk chopper wheel. This is very different from prior art designs such as that shown in FIG. 3, wherein a chopper wheel is completely enclosed by a full enclosure to confine radiation. The substantially smaller source-side scatter plate having the features described herein results in similar confinement of scattered x-rays, as illustrated in connection with FIGS. 9-10, for example, and also provides for substantially reduced weight of a chopper wheel assembly, facilitating handheld x-ray scanning, as illustrated in FIG. 1A, in addition to any x-ray scanning application.

The source-side scatter plate 103 may be formed of tungsten, another material having a high Z (atomic number), or an alloy of one of these materials, etc. The source-side scatter plate may have a thickness in certain embodiments on the order of 1.0 mm, for example. Thickness of the scatter plate is further illustrated in connection with FIG. 5B, for example.

The cross-sectional area of the source-side scatter plate 103 may be in a range of about 100% to about 5,000% larger than an open cross-sectional area of one of the radial slit openings 121 in the disk chopper wheel, for example. An open cross-sectional area of one of the radial slit openings is further illustrated in connection with FIG. 7, for example. However, in yet other embodiments, the source-side scatter plate cross-sectional area may be in a range of, for example, 500% to 10,000% larger than the cross-sectional area of a radial slit opening in the chopper wheel. In general, the cross-sectional area of the source-side scatter plate should be sufficient to intersect the entire fan beam 16 with the exception of part of the fan beam incident at the open slot 107. In this manner, at any orientation of a radial slit 121, only a pencil beam 23 can emerge from the chopper wheel when a portion of a radial slit 121 is aligned with a portion of the open slot 107. The source-side scatter plate 103 may be formed of pure or alloyed lead, tin, iron, tungsten, or another high Z material, for example.

While the assembly 100 of FIG. 1B includes only a source-side scatter plate 103 for confinement of scattered x-rays, in other embodiments, such as that described in connection with FIGS. 4A-4B, for example, an output-side scatter plate may also be included. The output-side scatter plate, like the source-side scatter plate, can have a solid cross-sectional area in a plane parallel to the rotation plane of the disk chopper wheel that is, where the solid cross-sectional area of the output-side scatter plate is substantially smaller than the solid cross-sectional area of the disk chopper wheel. Furthermore, the output-side scatter plate may be configured to absorb, like the source-side scatter plate, x-ray radiation and may define an open slot therein, like the open slot 107, that is configured to pass x-ray radiation. Moreover, while the source-side scatter plate 103 is a single-layered plate, other source-side or output-side scatter plates within the scope of embodiments may include multi-layered plates. It should be noted that an output-side scatter plate may have any of the other characteristics described herein for the source-side scatter plate.

The support structure 102 that secures the source-side scatter plate 103 may be advantageously formed of aluminum or another lightweight material. This is because the support structure 102 need not be relied upon for x-ray shielding or scattering confinement. Instead, the source-side scatter plate 103 (and in other embodiments, the output-side scatter plate) perform this function. Again, the limited size of the source-side scatter plate relative to the disk chopper wheel, together with the ability of other components such as the chopper wheel mount 105 and support structure 102 to be formed of lightweight materials, enable dramatically lower weight for various types of x-ray scanning systems, such as the handheld scanner 155 of FIG. 1A. Embodiment support structures may be configured to support bearings on a disk chopper wheel that rotates. Support structures may also be configured to support a drive motor that rotates the chopper wheel.

Embodiment x-ray assemblies may be used in systems using a wide range of x-ray energies. An x-ray source such as the x-ray tube 14 may be configured to output x-rays having an end-point energy in a range of about 120 kiloelectron volts (keV) to about 450 keV, for example. Furthermore, in other embodiments, this energy range may be between about 120 keV and about 160 keV, for example. In particular, handheld scanning systems, such as that of the scanner 155 of FIG. 1A, may use x-rays on the lower end of this energy region, for example 120 keV.

In particular, in the embodiment of FIG. 1B, the source-side scatter plate is configured to output a fan beam 16 of x-rays through the open slot 107, and the assembly, including the scatter plate 103 and chopper wheel 101, may be configured to output the pencil beam 23.

Figure 2:
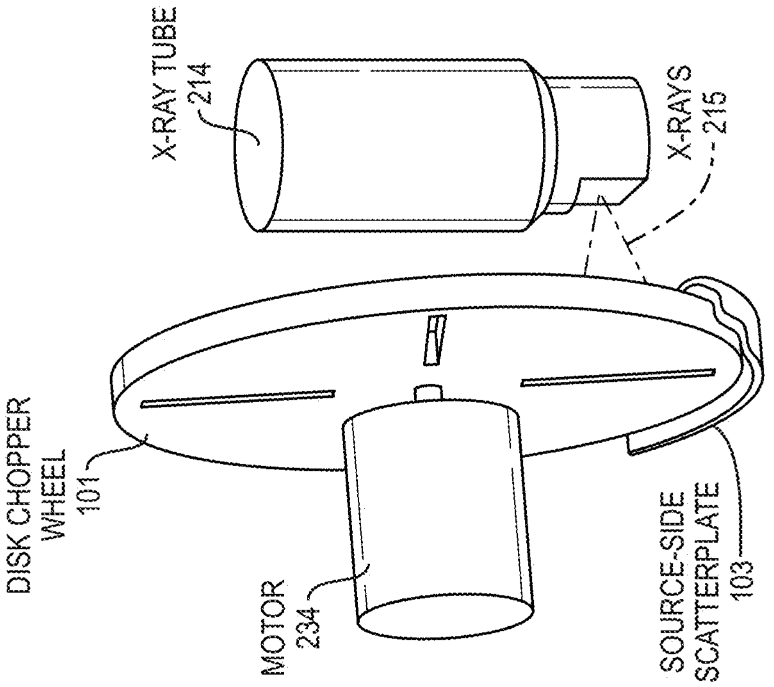
FIG. 2 is a perspective illustration of a disk chopper wheel and source-side scatter plate that may be used in an embodiment chopper wheel assembly.

FIG. 2 is a perspective-view illustration of an embodiment of the disk chopper wheel 101 of FIG. 1B, together with the source-side scatter plate 103. As illustrated in FIG. 2, the disk chopper wheel 101 may be rotated by the motor 234 or other mechanism in various embodiments. An x-ray tube 214 is used as a source of x-rays.

FIG. 3 is a perspective-view illustration of a prior art chopper wheel 218*a* that is fully enclosed by a chopper wheel enclosure 330*a-b*. X-rays enter the enclosure through an entry slot 319, are periodically blocked or passed by slits in the chopper wheel 218*a*, and pass as a pencil beam through the output exit slot 336 in the enclosure portion 330*b*. Each portion of the chopper wheel enclosure 330*a*, 330*b* must have certain thickness 338 to limit leakage of scattered x-rays from the enclosure.

A significant disadvantage of the arrangement of FIG. 3 is the weight that the enclosure has. As will be understood, the enclosure must be of sufficiently high atomic number and thickness to be able to limit x-ray exposure outside of the enclosure. This causes the enclosure to add significant weight to a scanning system and is a major disadvantage for any scanning system, especially a handheld or otherwise mobile scanning system that must be held or transported.

A significant advantage of the embodiments illustrated in FIGS. 1B, 2, and 4A-4B, for example, is that a source-side scatter plate (and optionally an output-side scatter plate) and the disk chopper wheel can perform the desired shielding to obtain the appropriate safety standards while being significantly lighter than the prior art embodiments in the prior art design illustrated in FIG. 3.

FIG. 4A is a perspective-view illustration of an embodiment x-ray chopper wheel assembly 400. The assembly 400 includes a disk chopper wheel 401 that is configured to rotate about a rotation axis 440. In the illustration of FIG. 4A, the rotation axis 440 coincides with the Z axis, as shown. The rotation axis 440 is perpendicular to a rotation plane of the disk chopper wheel 401. The rotation plane is parallel to the XY plane that is shown in FIG. 4A. The rotation plane is further illustrated in FIG. 5A. The disk chopper wheel 401 has a solid cross-sectional area in the rotation plane that is illustrated in FIG. 7. The wheel 401 is configured to absorb x-ray radiation traveling in a direction 444 from an x-ray source (not shown in FIG. 4A) that is received at a source side of the chopper wheel (the side where on x-rays are first incident, traveling along the direction 444). The disk chopper wheel 401 defines radial slits openings 421 around the wheel, and these radial slit openings are configured to pass x-ray radiation from the source side of the wheel to an output side of the disk chopper wheel. The source and output sides are further illustrated in FIG. 5B.

The assembly 400 further includes a source-side scatter plate 403 that has a solid cross-sectional area in a plane parallel to the rotation plane of the wheel. This cross-sectional area is illustrated in FIG. 8A. The source-side scatter plate 403 is configured to absorb x-ray radiation, and it defines an open slot therein that is configured to pass x-ray radiation. The open slot is further illustrated and described in connection with FIGS. 5A-5B and 8A, for example. Advantageously, the solid cross-sectional area of the source-side scatter plate is substantially smaller than the solid cross-sectional area of the disk chopper wheel, providing for operation of the assembly with significantly reduced weight and x-ray confinement similar to that of the prior art chopper wheel enclosure of FIG. 3.

Figure 5A:
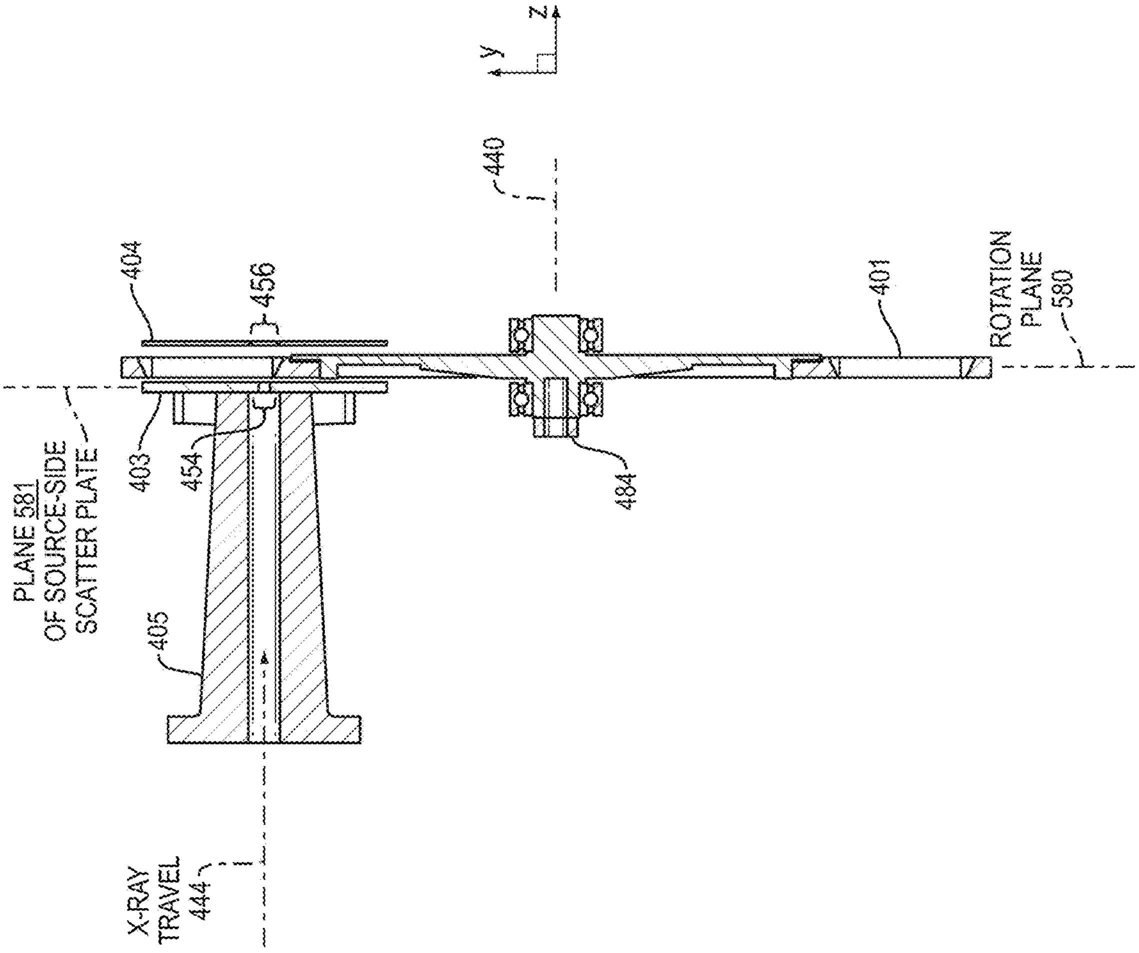
FIG. 5A is a cross-sectional view illustration of a disk chopper wheel, scatter plates, and a shield structure that form part of the assembly of FIGS. 4A-4B.
Figure 5B:
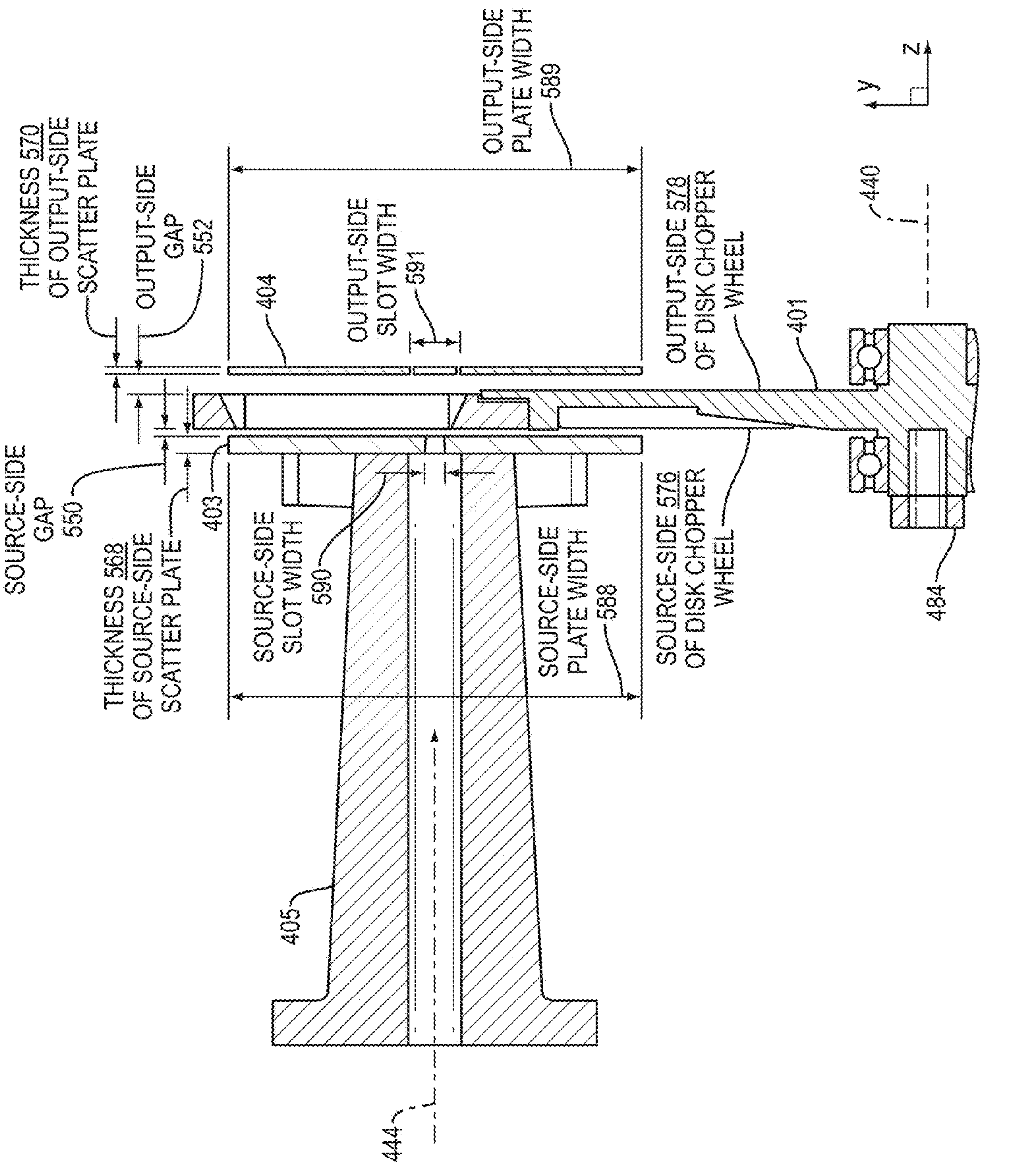
FIG. 5B is a magnified view of a portion of the cross-sectional illustration of FIG. 5A showing additional dimensional details and features of the embodiment assembly of FIGS. 4A-4B.

The source-side scatter plate 403 is secured by a support structure 402*a-b* that secures the source-side scatter plate substantially parallel to the rotation plane of the disk chopper wheel with a source-side gap between the source-side scatter plate and the source side of the disk chopper wheel, as further illustrated in FIGS. 5A-5B, for example. While an output-side scatter plate is generally optional, the assembly 400 does include an output-side scatter plate 404 that is secured by the support structure 402*a-b* to be substantially parallel to the rotation plane of the disk chopper wheel, similar to the source-side scatter plate 403. The support structure maintains an output-side gap between the output side of the scatter plate and the disk chopper wheel, as illustrated in FIG. 5B. In alternative embodiments not illustrated, the source-side and output-side scatter plates may form a single solid piece, the two scatter plates of which are connected by a bridge over the top of the chopper wheel 401 in FIG. 4A. Further in alternative embodiments, such a bridge structure may also be formed of a high-Z material to enhance shielding.

Figure 8A:
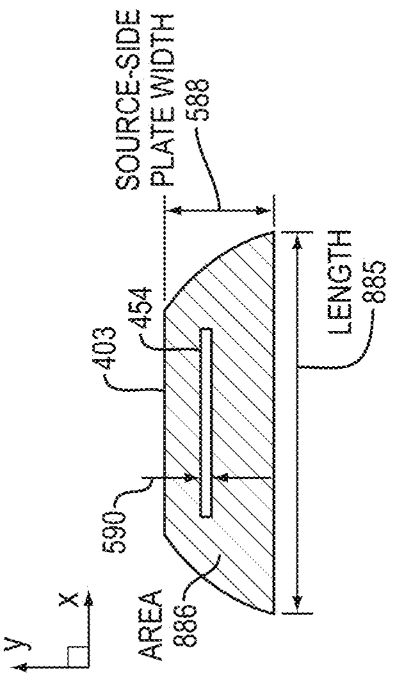
FIG. 8A is a cross-sectional view illustration of a source-side scatter plates used in the embodiment chopper wheel assembly of FIGS. 4A-4B.
Figure 8B:
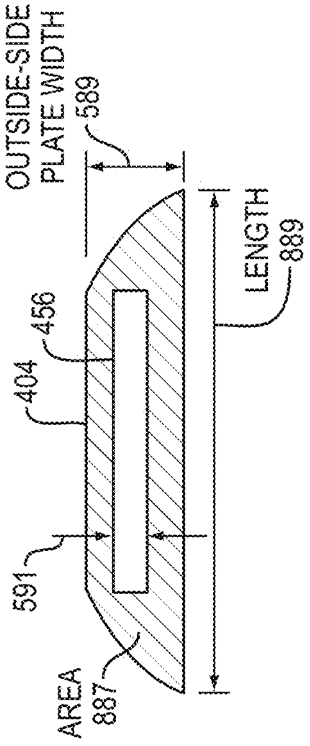
FIG. 8B is a cross-sectional view illustration of an output-side scatter plate used in the embodiment chopper wheel assembly of FIGS. 4A-4B.

The output-side scatter plate 404 has a solid cross-sectional area in a plane parallel to the rotation plane of the disk chopper wheel, as illustrated in FIG. 8B. The output-side scatter plate is configured to absorb x-ray radiation, yet it also defines an open slot therein (illustrated in FIG. 8B) that is configured to pass x-ray radiation that emanates through the source-side scatter plate 403 and slits 421 in the chopper wheel. Advantageously, the solid cross-sectional area of the output-side scatter plate 404, like that of the input source-side scatter plate, is substantially smaller than the solid cross-sectional area of the disk, further providing for a lightweight assembly.

In the embodiment assembly 400, the support structure 402*a-b* is further configured to secure the disk chopper wheel 401 at the rotation axis 440. Advantageously, therefore, the support structure 402*a-b* performs both the functions of securing the chopper wheel and the functions of securing the source-side and output-side scatter plates 403 and 404, respectively. Further, in the embodiment assembly 400, it will be noted that the support structure includes the two portions 402*a* and 402*b* on the source side and output side of the chopper wheel, respectively. This provides a particularly robust and stable configuration that performs many needed support functions. However, in other embodiments, such as in the assembly 100 illustrated in FIG. 1B, a support structure may be one-sided, and the chopper wheel and support structure may be secured and mounted separately, while still being secured with the source-side scatter plate being substantially parallel to the chopper wheel and having the appropriate gap between the source-side scatter plate and the source side of the chopper wheel.

Further in the embodiment assembly 400 in FIG. 4A, the support structure 402*a*-402*b* includes an inner portion 472 that is configured to secure the disk chopper wheel 401 at the rotation axis 440 thereof, and the support structure 402*b* further includes radial spokes 442 that extend outward from the inner portion 472 and are configured to secure both the source-side scatter plate 403 and output-side scatter plate 404 with the appropriate alignment and gap with respect to the chopper wheel. The support structure 402*a-b* does this by means of hardware 446 that secures the two sides of the support structure 402*a* and 402*b* together while simultaneously securing the chopper wheel 401, as further illustrated in the exploded-view drawing of the assembly in FIG. 4B. Accordingly, the source-side portion 402*a* and output side portion 402*b* of the support structure are configured to be connected together and to secure the disk chopper wheel between the two portions of the support structure.

The support structure 402*a-b* is formed of aluminum, advantageously, for lighter weight. In other embodiments, other materials may be used. Nonetheless, aluminum may be advantageously used because of cost, sufficient rigidity and strength, and because the source-side and output-side scatter plates provide the desired shielding, while the support structure need not be relied upon for x-ray shielding.

The assembly 400 further includes an optional shield structure 405 that is configured to enclose the x-ray radiation in a region of travel between the x-ray source (e.g., x-ray tube, not shown in FIG. 4A) and the source-side scatter plate 403. The shield structure 405 may be formed of a high-Z material, for example, such as tungsten, lead, iron, or another high-Z material having sufficient thickness to prevent incident or scattered x-rays from being emitted outside of the device. The particular function and features of the shield structure 405 are further illustrated in FIGS. 4B, 5A-5B, 6, and 9, for example.

FIG. 4B is an exploded, perspective-view illustration of the assembly 400 of FIG. 4A. As illustrated in greater detail in FIG. 4B, the hardware 446 includes securing features 492*a* at ends of the spokes of the source-side support structure 402*a* and securing features 492*b* at ends of the spokes of the support structure 402*b* on the output side.

As also illustrated in greater detail in FIG. 4B, the chopper wheel 401 includes bearings 484 on either side thereof, which are configured to fit into securing features 482*a*-482*b* within the support structure portions 402*a* and 402*b*, respectively, in order to secure the disk chopper wheel 401 at the rotation axis 440 thereof. The support structure portions 402*a* and 402*b* further include features for securing the source-side and output-side scatter plates 403 and 404, respectively. Also illustrated in greater detail in FIG. 4B are an open slot 454 defined by the source-side scatter plate 403, as well as an open slot 456 defined in the output-side scatter plate 404. These open slots, which allow for x-rays to pass through, are further described in connection with FIGS. 5A-5B, 6, 8A-8B, and 9.

FIG. 5A is a cross-sectional profile view of the chopper wheel 401, source side and output-side scatter plates 403 and 404, respectively, and the shield structure 405 of the embodiment assembly 400 of FIGS. 4A and 4B. As also illustrated in FIG. 5A, the chopper wheel rotates about the rotation axis 440, which is perpendicular to a rotation plane 580 of the chopper wheel 401. In this illustration, the rotation axis 440 coincides with the z-axis in the Cartesian coordinates shown. The rotation plane 580 of the chopper wheel is perpendicular to the rotation axis 440 and lies in a plane parallel to the XY plane in the Cartesian coordinates shown. The source-side scatter plate 403 is secured in a plane 581 that is parallel to the rotation plane 580 of the disk chopper wheel.

As illustrated in FIG. 5A further, the output-side scatter plate 404, like the source-side scatter plate 403, is secured to be substantially parallel to the rotation plane of the disk chopper wheel 401. An output-side gap between the output-side scatter plate and the disk chopper wheel is illustrated in greater detail in FIG. 5B.

FIG. 5B is a magnified view of a portion of the cross-sectional profile illustration shown in FIG. 5A. FIG. 5B particularly illustrates various dimensions of the embodiment assembly 400 of FIGS. 4A-4B. The source-side scatter plate 403 has a thickness 568 and a source-side gap 550 between the scatter plate 403 and the chopper wheel 401. The source-side scatter plate 403 further includes the source-side scatter plate having a source-side slot width 590 that allows x-rays to pass through to a source side 576 of the disk chopper wheel 401. When the slot 454 is blocked by a solid portion of the chopper wheel 401, x-ray radiation is blocked from passing through the chopper wheel. On the other hand, as the chopper wheel rotates, when a radial slit of the chopper wheel intersects with the source side slot 454 along a direction of the x-ray travel 444, x-rays 444 pass through the slot 454 and through the radial slit defined in the chopper wheel 401.

The output-side scatter plate 404 similarly has a thickness 570 and an output-side gap 552 between the scatter plate 404 and the output side 578 of the disk chopper wheel.

Figure 10:
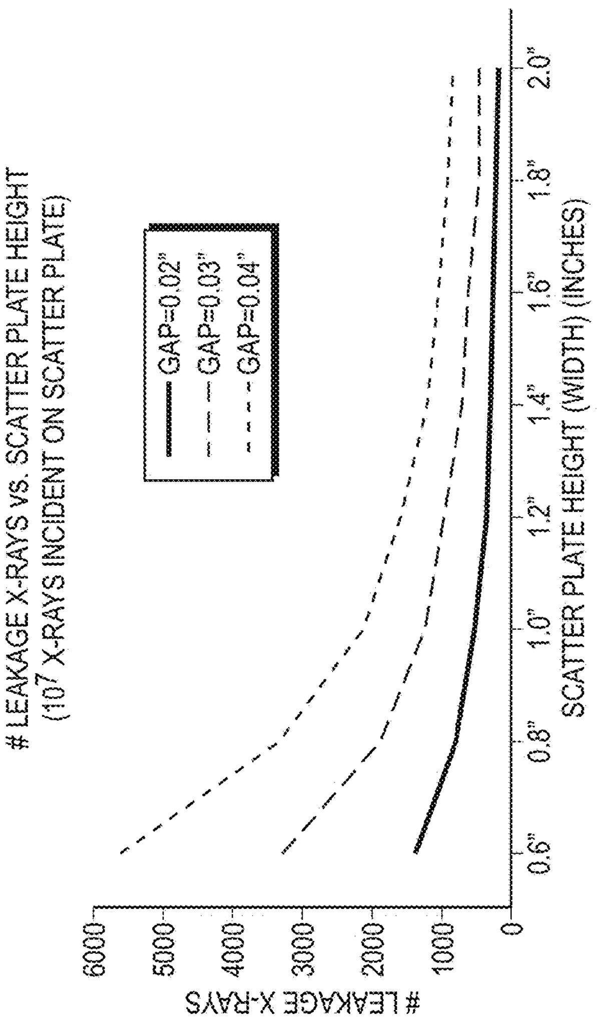
FIG. 10 is a graph showing calculated x-ray leakage for various gaps between the source-side scatter plate and disk chopper wheel of FIGS. 4A-4B as a function of scatter plate width.
Figure 9:
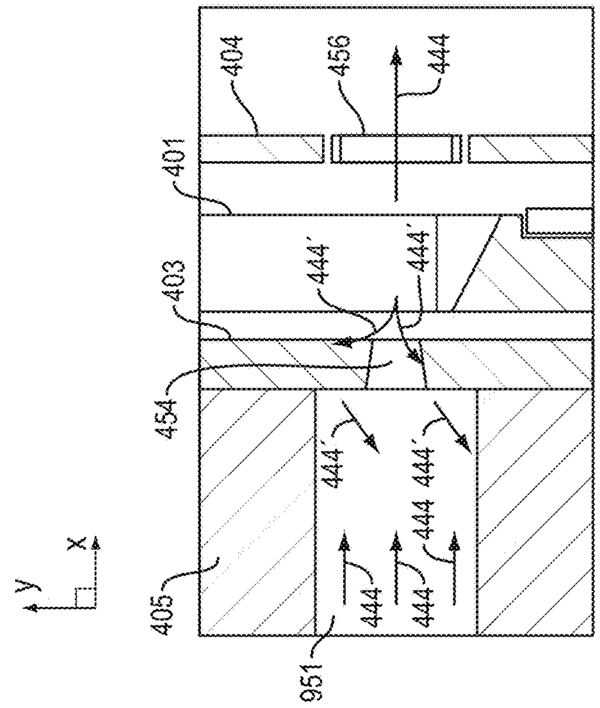
FIG. 9 is a magnified view of a portion of the cross-sectional illustration of FIG. 5A, further illustrating the action of the disk chopper wheel, source-side scatter plate, an output-side scatter plate, and shield assembly of the embodiment chopper wheel assembly of FIGS. 4A-4B, specifically the action of these components to substantially confine scattered x-ray radiation.

The source-side gap 550 may be in a range of approximately 0.5 mm to approximately 1.0 mm, for example. As this gap increases, leakage of scattered x-rays also increases, as illustrated in FIGS. 9-10, for example. Other example source side gaps may be in a range of approximately 0.2 mm to approximately 2.0 mm, approximately 0.5 mm to approximately 1.25 mm, approximately 0.5 mm to approximately 0.75 mm, approximately 0.02 inches to approximately 0.04 inches, or approximately 0.03 inches, for example. In the context of source-side gaps or output-side gaps, as used herein, “approximately” denotes a tolerance of +/−0.25 mm.

As used herein, the source-side scatter plate 403 may be considered to be “substantially parallel” to the rotation plane of the chopper wheel when the source-side scatter plate and rotation plane of the disk chopper wheel are sufficiently parallel such that the chopper wheel may freely rotate without contacting the scatter plate 403. In a similar manner, the output-side scatter plate 404 may be considered to be “substantially parallel” to the chopper wheel 401 when the chopper wheel may freely rotate without risk of contact with the scatter plate 404. Where there is some degree of slight angle between either of the scatter plates and the rotation plane of the chopper wheel, the gap 550 or gap 552 may be considered to be the average distance between the plate 403 and the source side 576 of the disk chopper wheel or the average distance between the scatter plate 404 and the output side 578 of the disk chopper wheel.

FIG. 5B also illustrates that the source-side scatter plate 403 has a source-side plate width 588, measured parallel to the y-axis in FIG. 5B. Similarly, the output-side scatter plate 404 has an output-side plate width 589, similarly measured. The plate widths 588 and 589, which are measured in a direction parallel to a radial direction of the disk chopper wheel along the vertical y-axis in FIG. 5B, may be in a range of about 10% to about 70% greater than a slit length of one of the radial slit openings in the radial direction of the disk chopper wheel. These radial slit lengths are further illustrated in FIG. 7, and the plate widths are further illustrated in FIGS. 8A and 8B, respectively.

In general, as the plate width increases, leakage of scattered x-rays decreases for a given gap. In general, greater scatter plate width relative to slit length of radial slits in the chopper wheel leads to greater confinement and less leakage of x-rays. The relationship is further illustrated in FIG. 10 for the embodiment of FIGS. 4A-4B, assuming that only the source-side scatter plate in FIGS. 4A-4B is used, since the source-side scatter plate has a much larger impact on reducing x-ray leakage. Nonetheless, substantial confinement can occur with a limited size of a source-side scatter plate, as described herein, leading to operation of an x-ray scanner meeting leakage standards comparable to those of the prior art design in FIG. 3. As used herein, “substantial confinement” of x-ray radiation denotes that the disk chopper wheel and source-side scatter plate are arranged relative to each other with gaps, plate width, etc. such that x-ray leakage of scattered radiation is limited to no more than 50% leakage of the radiation that is scattered by the wheel, or to an x-ray radiation dose of no more than 5 milli-Rem per hour at a distance of 5 cm away from an outer surface of the assembly, whichever is greater. The substantial confinement may further include limiting leakage of scattered radiation to no more than 10% of radiation that is scattered by the assembly, or to a radiation dose of no more than 0.5 milli-Rem per hour at a distance of 5 cm away from the outer surface of the assembly, such as from the outer surface of the support structure, whichever is greater. In some embodiments, radiation leakage is limited to that which would be achieved by a full shield enclosure such as the enclosure 330*a-b* illustrated in FIG. 3 having a thickness and material similar to those of a given embodiment source-side scatter plate. In general, X-ray leakage may be limited to that which is considered safe for a particular scanning environment or application by adjusting plate width and gap as desired. “Substantial confinement” as used herein may also be achieved with the aid of an output-side scatter plate, such as the plate 404 of the embodiment assembly 400. “Substantial confinement” as used herein may also be achieved with the aid of the optional shield structure 405 arranged relative to the disk chopper wheel and source-side scatter plate.

Plate width is preferably greater than the lengths of radial slits in the chopper wheel, and the scatter plates all preferably fully overlap in cross section with the radial slits in the scatter plate, in order to enhance shielding. Nonetheless, it is also preferable for scatter plate width to be a small as possible in order to minimize total assembly weight. Accordingly, in example embodiments, as described above, the plate widths 588 and 589 may be in a range of about 10% to about 70% greater than a slit length of one of the radial slit openings. Furthermore, plate widths may be in other example ranges, such as about 5% to about 100%, about 10% to about 80%, about 20% to about 70%, about 30% to about 60%, or about 40% to about 50% greater than the slit length, depending on the plate gaps 550 and 552 and the desired maximum radiation leakage. In the context of plate widths, “about” as used herein denotes a tolerance of +/−5%.

Figure 6:
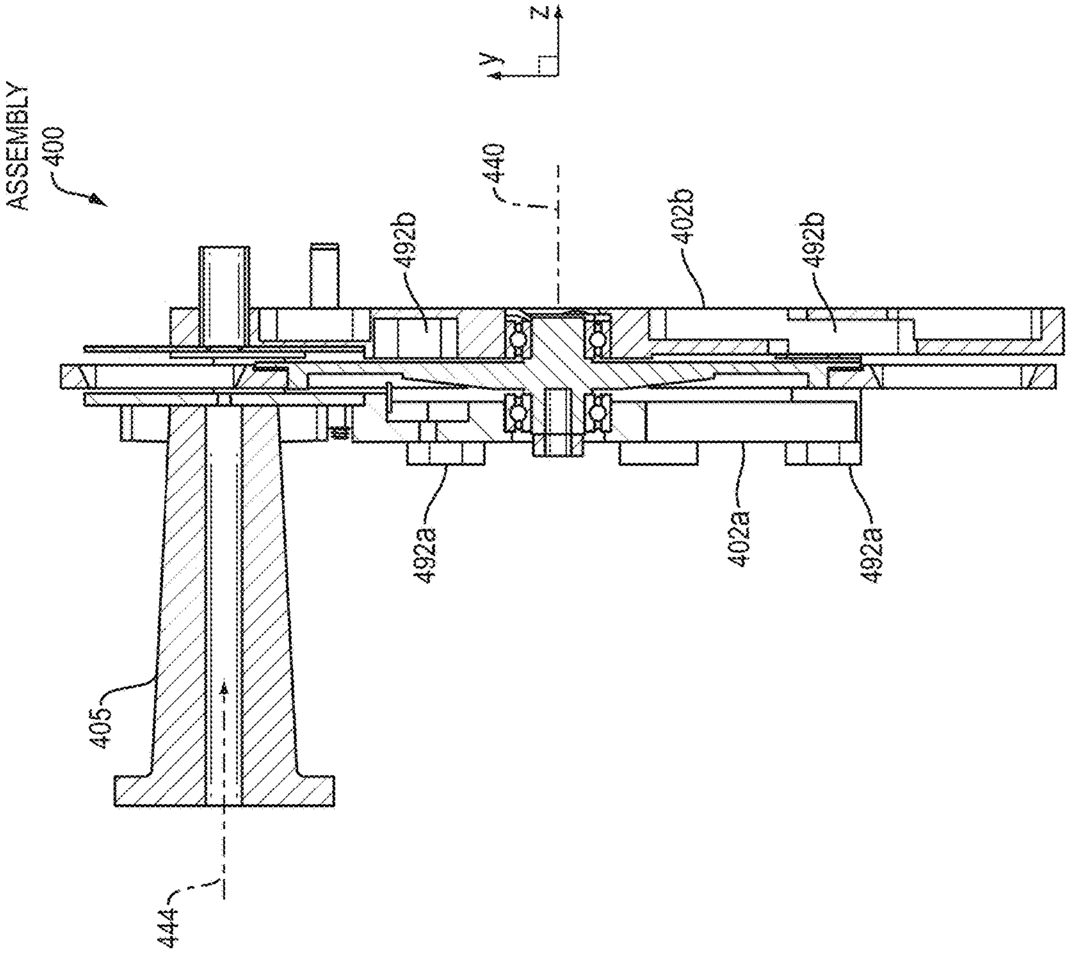
FIG. 6 is a cross-sectional view illustration of the full chopper wheel assembly illustrated in FIGS. 4A-4B.

FIG. 6 is a cross-sectional, profile-view illustration of the full assembly 400 illustrated in FIGS. 4A-4B.

FIG. 7 is a cross-sectional profile-view of the disk chopper wheel 401 of the assembly 400 illustrated in FIGS. 4A-4B. The disk chopper wheel 401 has a diameter 783. Radial directions 774*a* and 774*b* are shown for the disk chopper wheel. In the illustration of FIG. 7, these radial directions happen to be aligned parallel to the y-axis and x-axis, respectively. A radial slit length 793 of the radial slit openings is measured along the radial direction. The width of the source-side scatter plate 403 may be only slightly greater than the radial slit length 793. For example, the plate width may be about 10% to about 70% greater than the radial slit length. The size of the source-side scatter plate relative to the slit length may vary depending on the leakage tolerance. Calculated leakage is illustrated in FIG. 10 for various source-side scatter plate gaps and scatter plate widths 588. Scatter plate width 588 is also referred to as “height” in FIG. 10. Also illustrated in FIG. 7 is an open cross-sectional area 787 of the radial slits.

The chopper wheel has a total area 786, which is the total cross-sectional area of solid portions of the chopper wheel, including solid portions of the inner hub 449 and of the outer disk 448 and excluding the open areas constituting the radial slits and excluding any other holes or openings introduced into the chopper wheel, such as holes in the inner hub 449 illustrated in FIG. 4A. Where wheel slits or other openings include chamfering, the cross-sectional area of the solid portions of the chopper wheel may be considered to be the cross-sectional area through the center of the wheel (in the rotation plane).

FIG. 8A is a cross-sectional profile view of the source-side scatter plate 403 of the embodiment assembly 400. The cross section is in the plane 581 illustrated in FIG. 5A, which is parallel to the rotation plane 580 of the disk chopper wheel. The solid cross-sectional area 886 may be substantially smaller than the solid cross-sectional area 786 of the chopper wheel, as illustrated in FIG. 7, and as previously described. In addition to the source-side plate width 588, the plate 403 has a source-side plate length 885.

FIG. 8B is a cross-sectional profile view of the output-side scatter plate 404, which has a total solid cross-sectional area 887. This area 887 may be substantially smaller than the total cross-sectional solid area 786 of the disk chopper wheel for further advantages beyond those described above in relation to the solid cross-sectional area of the source-side scatter plate 403. Furthermore, the output-side scatter plate may have any of the features described herein in relation to the source-side scatter plate. In the embodiment of FIGS. 4A-4B, the slot width 591 of the output-side plate 404 is greater than the slot width of the source-side scatter plate 403. However, in other embodiments, these relative slot widths may differ or be the same. In addition to the output-side plate width 589, the plate 404 has an output-side plate length 889.

As described in connection with FIG. 3, in existing chopper wheel assemblies, the chopper wheel is completely enclosed by a chopper wheel enclosure in order to provide adequate x-ray shielding and safety. Accordingly, existing assemblies result in the chopper wheel enclosure being at least somewhat larger in cross-sectional area than the chopper wheel. In contrast to the existing assembly in FIG. 3, the solid cross-sectional area of the source-side scatter plate of the embodiment assembly 400, which is illustrated in FIG. 8A in greater detail, advantageously may be substantially smaller than the solid cross-sectional area of the disk chopper wheel.

As used herein, a solid cross-sectional area of the source-side scatter plate is "substantially smaller" than the solid cross-sectional area of the disk chopper wheel of an embodiment assembly when either the source-side plate width 588 or the source-side plate length 885 of the source-side scatter plate is smaller than the diameter 783 of the disk chopper wheel. In various embodiments, both the width 588 and length 885 of the source-side scatter plate may be smaller than the diameter 783 of the disk chopper wheel.

In some embodiments, the solid cross-sectional area of the source-side scatter plate may be smaller than a corresponding full enclosure would need to be in an enclosure width or length to enclose the chopper wheel fully. Further, in various embodiments, the source-side scatter plate may be smaller in weight than a corresponding full-shield enclosure would need to be to provide a comparable level of x-ray shielding. In various example embodiments, the solid cross-sectional area of the source-side scatter plate may be less than 90%, less than 70%, less than 50%, less than 40%, less than 30%, less than 25%, less than 15%, or less than 10% of the cross-sectional area 786 of the disk chopper wheel. Nonetheless, it is preferable for the solid cross-sectional area of the source-side scatter plate to be less than 50%, less than 25%, or less than 10% of the cross-sectional area 786 of the disk chopper wheel in order to reduce assembly weight the most and obtain maximum benefits of embodiment assemblies over the existing assembly in FIG. 3. This example solid cross-sectional area 787 of shielding material of the source-side scatter plate, which is significantly reduced relative to the enclosure 330*a-b* illustrated in FIG. 3, is a major advantage of embodiments described herein for reduced weight and material usage. Similar dimensional characteristics may apply to the output-side scatter plate relative to the disk chopper wheel.

FIG. 9 is a cross-sectional profile view showing part of the illustration of FIG. 5B, further magnified to show x-ray confinement properties. The shield structure 405 substantially encloses x-ray radiation 444 in a region of travel 951 between the x-ray source (not shown in FIG. 9) and the source-side scatter plate 403. Any x-rays 444 that are not traveling straight toward the scatter plate 403, perpendicular to the scatter plate, may be safely absorbed by the shield structure 405. Furthermore, scattered x-rays 444' that are scattered from the source-side scatter plate may also be safely absorbed by the shield structure 405. The shield structure 405 may be considered to substantially confine x-rays traveling in the region 951 when any leakage x-rays are reduced to the level that is safe for the assembly to operate.

FIG. 9 further illustrates the operation of the source-side scatter plate 403 to prevent x-ray leakage. When x-rays 444 traverse the slot 454 in the source-side scatter plate and strike a solid portion of the disk chopper wheel 401, the scattered x-rays 444' are absorbed by the scatter plate, and very few scattered x-rays 444' escape, assuming that the gap between the source-side scatter plate and chopper wheel is sufficiently small, as already described herein. A similar principle applies to the output-side scatter plate 404, which is used in the embodiment illustrated in FIGS. 4A-4B. In the case of the output-side scatter plate 404, most of the scattered x-rays that need to be absorbed are scattered from the edges of the radial slits in the disk chopper wheel 401.

FIG. 10 is a graph illustrating calculated x-ray leakage as a function of scatter plate height (plate "width," as used herein) for various gap sizes between the source-side scatter plate and the source side of the chopper wheel illustrated in FIGS. 4A-4B and 5B. The combination of the disk chopper wheel, source-side scatter plate, and output-side scatter plate used in the assembly 400 of FIGS. 4A-4B are arranged relative to each other to substantially confine x-ray radiation scattered therefrom, as illustrated in FIG. 9.

FIG. 10 shows the calculated leakage that will occur, which can guide a setting of gap width between the source-side scatter plate and the source side of the disk chopper wheel and a determination of desired plate width to decrease x-ray leakage to an acceptable level. As will be noted, as scatter plate width increases, leakage of scattered x-rays decreases. Conversely, as gap increases, the number of scattered x-rays that are leaked outside the assembly increases. "Substantial confinement" of scattered x-rays, as used herein, is further described herein in connection with FIG. 5B. The substantial confinement may limit leakage of scattered radiation to no more than 50% leakage of the radiation that is scattered by the wheel, or to an x-ray radiation dose of no more than 5 milli-Rem per hour at a distance of 5 cm away from an outer surface of the assembly, whichever is greater. The substantial confinement may limit leakage of scattered radiation to no more than 10% of scattered radiation or to a dose of no more than 0.5 milli-Rem per hour at a distance of 5 cm away from the outer surface of the assembly, whichever is greater.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. An x-ray chopper wheel assembly comprising:

a chopper wheel (i) defining at least one opening, configured to pass x-ray radiation from an x-ray source at a source side of the chopper wheel to an output side of the chopper wheel, and (ii) having a solid cross-sectional area in a rotation plane thereof, the chopper wheel configured to absorb x-ray radiation from the x-ray source; and a plate having a solid cross-sectional area, in a plane parallel to the rotation plane of the chopper wheel, that is substantially smaller than the solid cross-sectional area of the chopper wheel, the plate disposed in a plane substantially parallel to the rotation plane of the chopper wheel and arranged relative to the chopper wheel to substantially confine x-ray radiation scattered therefrom by absorbing the x-ray radiation scattered from the chopper wheel, such that a requirement for a housing enclosure to shield the x-ray radiation scattered from the chopper wheel is avoided.

2. The assembly of claim 1, wherein the solid cross-sectional area of the plate is less than 50%, less than 25%, or less than 10% of the solid cross-sectional area of the chopper wheel.

3. The assembly of claim 1, wherein the plate is further disposed with a gap between the plate and the chopper wheel, the gap in a range of approximately 0.2 mm to approximately 2.0 mm.

4. The assembly of claim 1, wherein the plate comprises tungsten or another high-Z material and has a thickness on the order of 1.0 mm.

5. The assembly of claim 1, wherein the solid cross-sectional area of the plate is in a range of about 100% to about 5,000% larger than an open cross-sectional area of the at least one opening in the rotation plane of the chopper wheel.

6. The assembly of claim 1, wherein the plate has a plate width in a direction parallel to a radial direction of the chopper wheel, the plate width being in a range of about 10% to about 70% greater than a length of the at least one opening in the radial direction.

7. The assembly of claim 1, wherein the plate is formed of a material selected from the group consisting of lead, tin, iron, tungsten, and alloys thereof.

8. The assembly of claim 1, further comprising a shield structure configured to enclose the x-ray radiation in a region of travel between the x-ray source and the plate.

9. The assembly of claim 1, wherein the x-ray source is configured to output x-rays having an energy in a range of about 120 kiloelectron volts (keV) to about 450 keV.

10. The assembly of claim 1, wherein the plate is configured to output a fan beam of x-rays through an open slot therein, and wherein the assembly is configured to output a pencil beam of x-rays.

11. The assembly of claim 1, wherein the substantial confinement limits leakage of scattered radiation to no more than 10% of scattered radiation or to a dose of no more than 0.5 milli-Rem per hour at a distance of 5 cm away from an outer surface of the assembly, whichever is greater.

12. The assembly of claim 1, further comprising a support structure configured to secure the plate substantially parallel to the rotation plane of the chopper wheel and to arrange the plate to substantially confine the scattered x-ray radiation scattered.

13. The assembly of claim 12, wherein the support structure is further configured to secure the chopper wheel at a rotation axis thereof.

14. The assembly of claim 12, wherein the support structure includes an inner portion configured to secure the chopper wheel at the rotation axis thereof, the support structure further including one or more radial spokes extending from the inner portion and configured to secure the plate.

15. The assembly of claim 12, wherein the support structure includes a source-side portion and an output-side portion, the source-side and output-side portions configured to be connected together and to secure the chopper wheel therebetween.

16. The assembly of claim 12, wherein the support structure is formed of aluminum.

17. The assembly of claim 12, wherein the support structure is configured to be mounted within a handheld x-ray scanner.

18. The assembly of claim 12, wherein the support structure is configured to be mounted within a fixed-mount or mobile x-ray scanning system.

19. The assembly of claim 12, wherein the support structure includes a housing configured to enclose the chopper wheel.

20. The assembly of claim 19, wherein the housing is unshielded as to the substantial confinement of scattered x-ray radiation scattered from the chopper wheel.

21. A method of confining x-ray radiation to be scattered from an x-ray chopper wheel, the method comprising:

configuring the chopper wheel (i) to pass x-ray radiation from an x-ray source at a source side of the chopper wheel to an output side of the chopper wheel and (ii) a solid cross-sectional area, in a rotation plane thereof, configured to absorb x-ray radiation from the x-ray source;

providing a plate, having a solid cross-sectional area substantially smaller than the solid cross-sectional area of the chopper wheel; and disposing the plate in a plane substantially parallel to the rotation plane of the chopper wheel and arranged relative to the chopper wheel to substantially confine x-ray radiation scattered therefrom by absorbing the x-ray radiation scattered from the chopper wheel, such that a requirement for a housing enclosure to shield the x-ray radiation scattered from the chopper wheel is avoided.

22. The method of claim 21, wherein disposing the plate includes securing the plate with respect to the chopper wheel using a support structure.

23. The assembly of claim 22, wherein using the support structure includes using a housing configured to enclose the chopper wheel.

24. The assembly of claim 23, wherein the housing is unshielded as to substantial confinement of scattered x-ray radiation.

25. A method of confining x-ray radiation to be scattered from an x-ray chopper wheel, the method comprising:

passing x-ray radiation from an x-ray source at a source side of the x-ray chopper wheel to an output side of the chopper wheel through at least one opening defined by the chopper wheel;

absorbing x-ray radiation from the x-ray source at a solid cross-sectional area of the chopper wheel in a rotation plane thereof; and substantially confining x-ray radiation scattered from the chopper wheel, by using a plate disposed in a plane substantially parallel to the rotation plane and having a solid cross-sectional area substantially smaller than the solid cross-sectional area of the chopper wheel, by the plate absorbing the x-ray radiation scattered from the chopper wheel, such that a requirement for a housing enclosure to shield the x-ray radiation scattered from the chopper wheel is avoided.

26. The method of claim 25, wherein substantially confining further includes using a support structure that secures the plate in the plane substantially parallel to the rotation plane.

27. The method of claim 26, wherein using the support structure includes using a housing that encloses the chopper wheel.

28. The method of claim 27, wherein the housing is unshielded as to substantial confinement of scattered x-ray radiation.

29. An x-ray chopper wheel assembly comprising:

a chopper wheel (i) defining at least one opening, configured to pass x-ray radiation from an x-ray source at a source side of the chopper wheel to an output side of the chopper wheel, and (ii) having a solid cross-sectional area in a rotation plane thereof, the chopper wheel configured to absorb x-ray radiation from the x-ray source; and a plate having a solid cross-sectional area, in a plane parallel to the rotation plane of the chopper wheel, that is substantially smaller than the solid cross-sectional area of the chopper wheel, the plate disposed in a plane substantially parallel to the rotation plane of the chopper wheel and arranged relative to the chopper wheel to limit x-ray radiation scattered therefrom to no more than 10% of scattered radiation.

30. An x-ray chopper wheel assembly comprising:

a chopper wheel (i) defining at least one opening, configured to pass x-ray radiation from an x-ray source at a source side of the chopper wheel to an output side of the chopper wheel, and (ii) having a solid cross-sectional area in a rotation plane thereof, the chopper wheel configured to absorb x-ray radiation from the x-ray source; and a plate having a solid cross-sectional area, in a plane parallel to the rotation plane of the chopper wheel, that is substantially smaller than the solid cross-sectional area of the chopper wheel, the plate disposed in a plane substantially parallel to the rotation plane of the chopper wheel and arranged relative to the chopper wheel to limit leakage of x-ray radiation scattered therefrom to a dose of no more than 0.5 milli-Rem per hour at a distance of 5 cm away from an outer surface of the assembly.

* * * * *